United States Patent
Blauvelt et al.

(10) Patent No.: US 7,228,032 B2
(45) Date of Patent: Jun. 5, 2007

(54) APPARATUS AND METHODS FOR LAUNCHING AN OPTICAL SIGNAL INTO MULTIMODE OPTICAL FIBER

(75) Inventors: Henry A. Blauvelt, San Marino, CA (US); David W. Vernooy, Sierra Madre, CA (US)

(73) Assignee: Xponent Photonics Inc., Monrovia, CA (US)

( * ) Notice: Subject to any disclaimer, the term of this patent is extended or adjusted under 35 U.S.C. 154(b) by 0 days.

(21) Appl. No.: 11/035,735

(22) Filed: Jan. 12, 2005

(65) Prior Publication Data
US 2005/0152643 A1    Jul. 14, 2005

Related U.S. Application Data

(60) Provisional application No. 60/536,176, filed on Jan. 12, 2004, provisional application No. 60/547,273, filed on Feb. 24, 2004.

(51) Int. Cl.
*G02B 6/26* (2006.01)
(52) U.S. Cl. .................................................. 385/31
(58) Field of Classification Search ............... 385/31, 385/38, 39, 50, 147
See application file for complete search history.

(56) References Cited

U.S. PATENT DOCUMENTS 4,164,364 A * 8/1979 Witte ........................... 385/31
5,416,862 A * 5/1995 Haas et al. .................... 385/28
6,501,884 B1 * 12/2002 Golowich et al. ............ 385/38

OTHER PUBLICATIONS

Johnson, Eric G. et al; Light Coupling by a Vortex Lens into Graded Index Fiber; J Lightwave Technology vol. 19 No. 5 p. 753 (May 2001).

* cited by examiner

*Primary Examiner*—Sarah Song
(74) *Attorney, Agent, or Firm*—David S. Alavi; Christie Parker & Hale LLP

(57) ABSTRACT

The launch conditions (injected beam size/shape, radial/angular offset from the multimode fiber axis) may be varied to preferentially excite certain transverse modes of multimode optical fiber. To reduce multimode dispersion in the fiber, modes are excited having smaller amplitudes near fiber index defects. Launch conditions may be controlled using a substrate with grooves for launching and receiving fibers, a planar waveguide formed on a substrate along with a groove for aligning the multimode fiber and waveguide, or free-space optical components. A waveguide may provide the desired injected beam size/shape. Spatially selective material processing enables accurate alignment of the groove(s) (and hence the fiber(s) therein), yielding the desired radial/angular offsets. Radial and azimuthal angular offset launch may be employed for constructing an optical mode conditioner, a transmit optical subassembly (TOSA), and other optical devices, assemblies, and subassemblies that launch an optical signal into a multimode optical fiber.

51 Claims, 12 Drawing Sheets

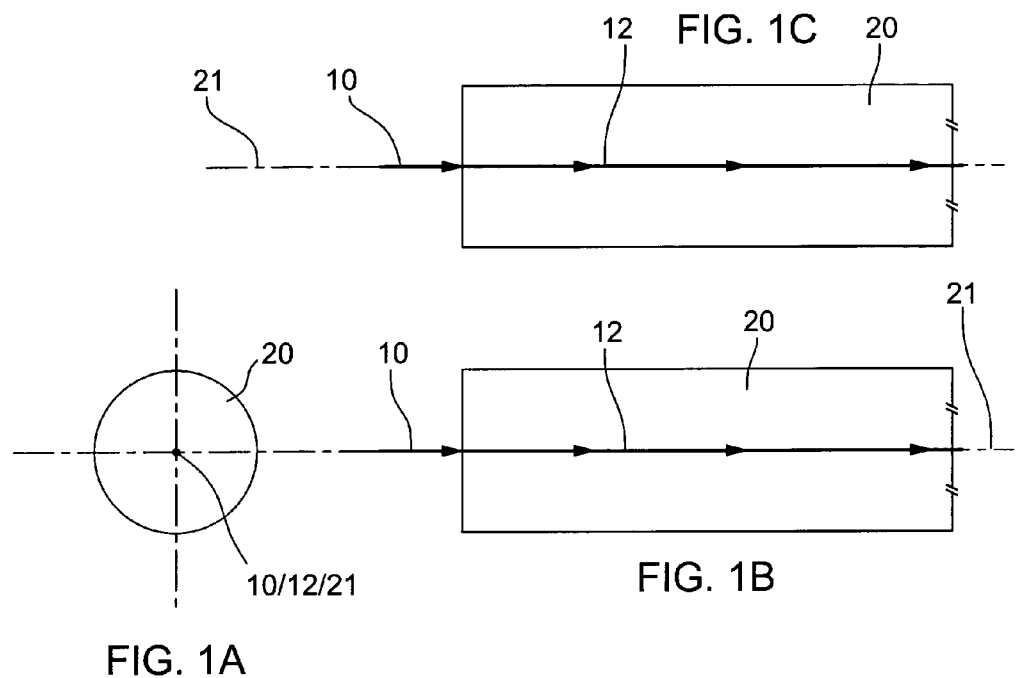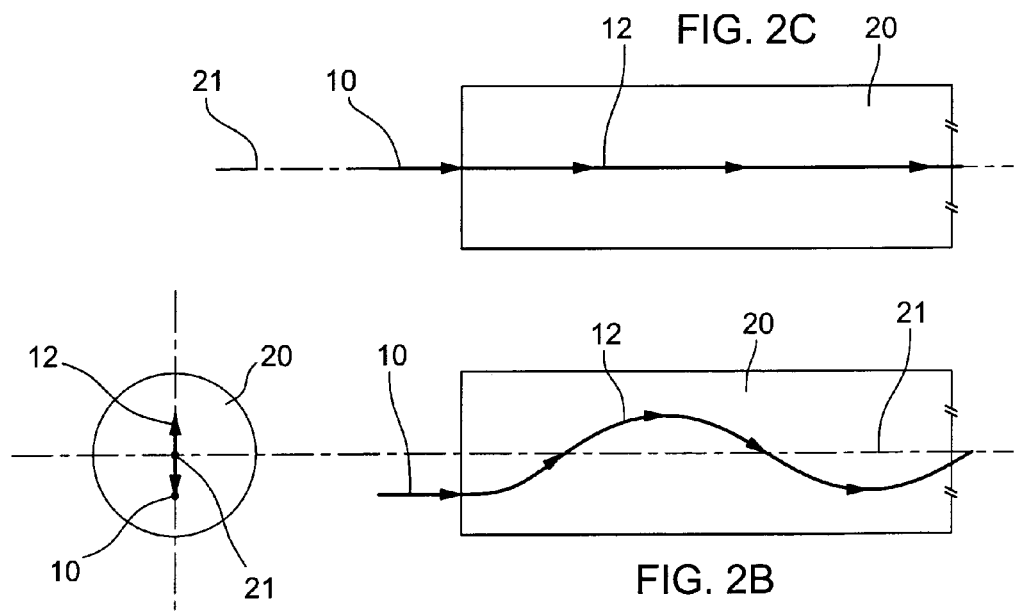

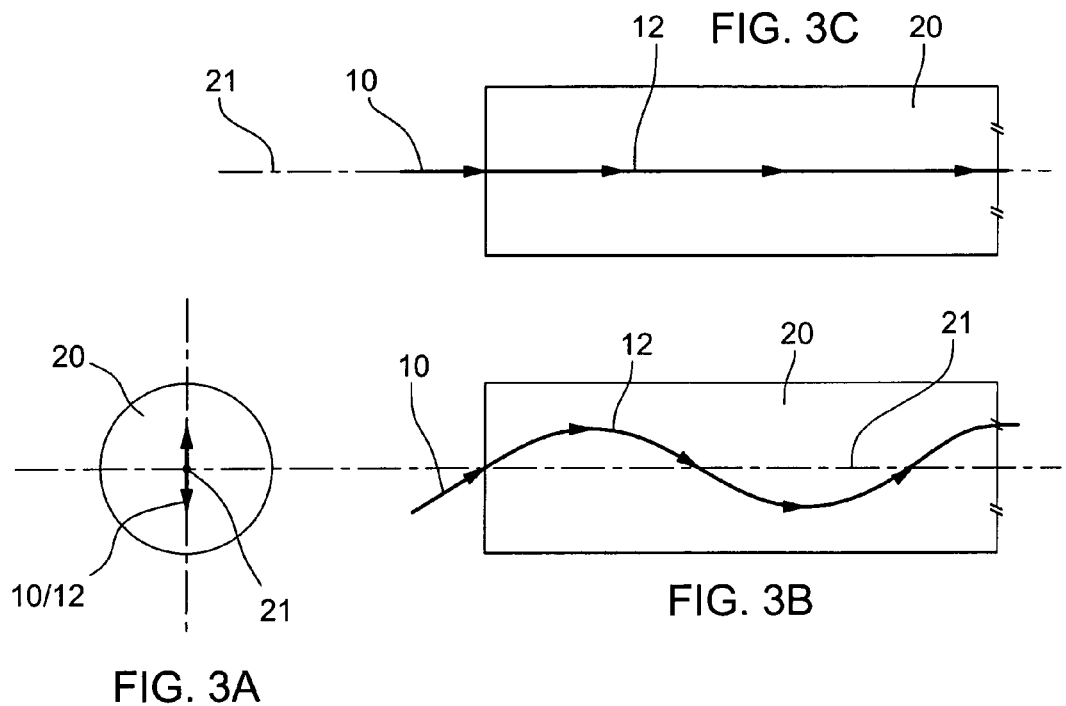
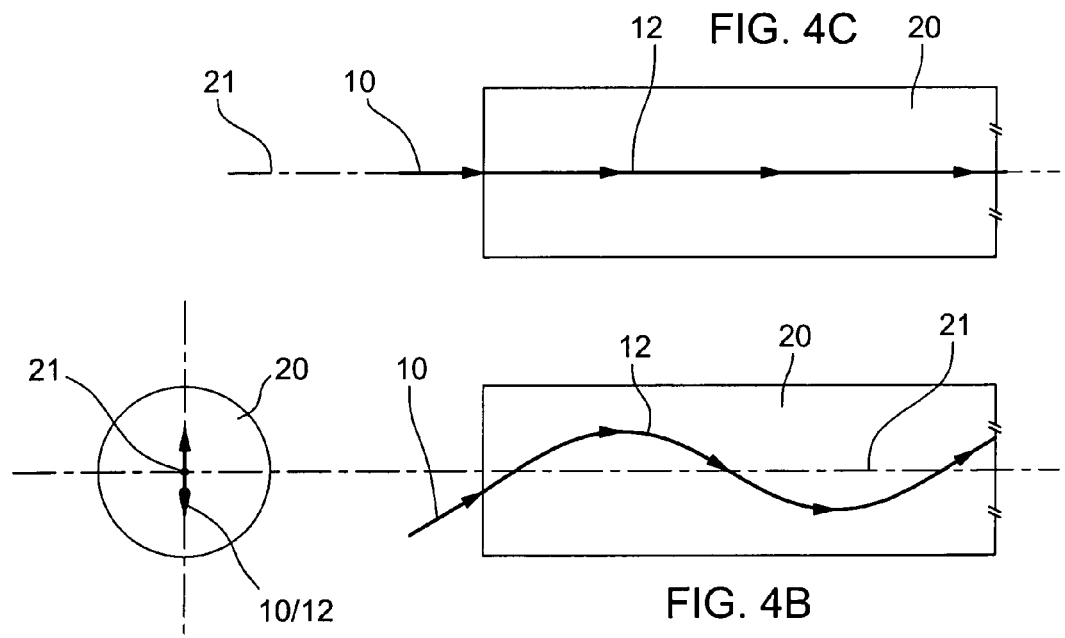

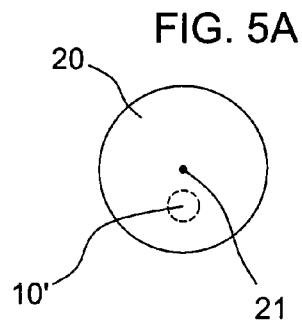
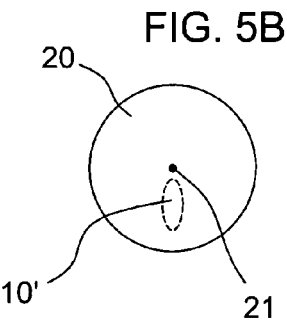
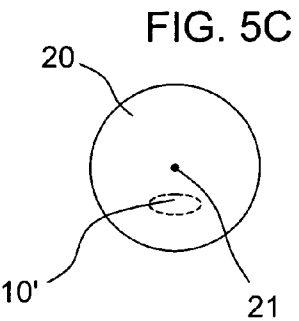
FIG. 5A  FIG. 5B  FIG. 5C
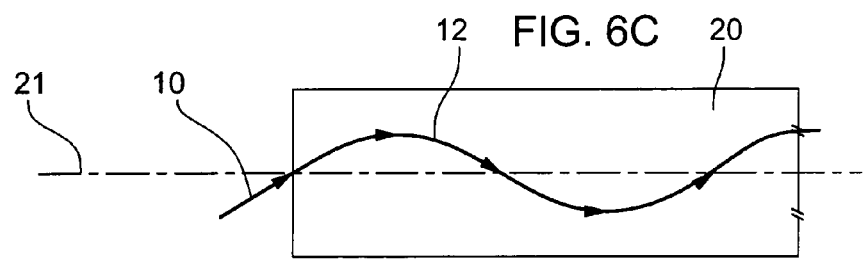
FIG. 6C
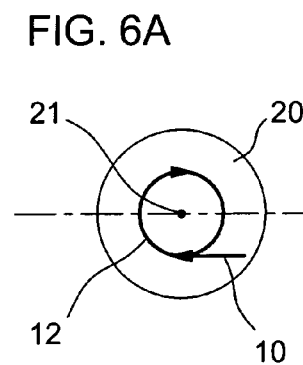
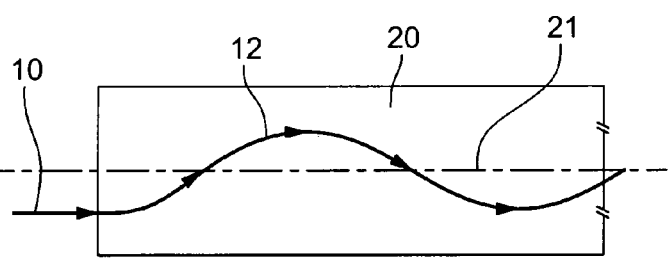
FIG. 6A
FIG. 6B
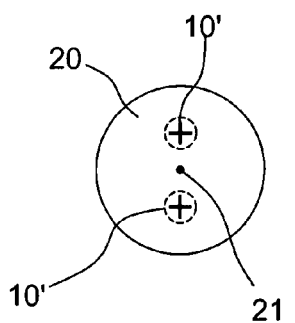
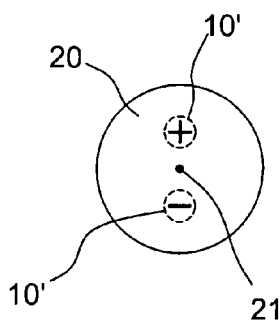
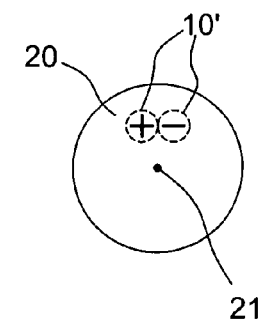
FIG. 7A  FIG. 7B  FIG. 7C

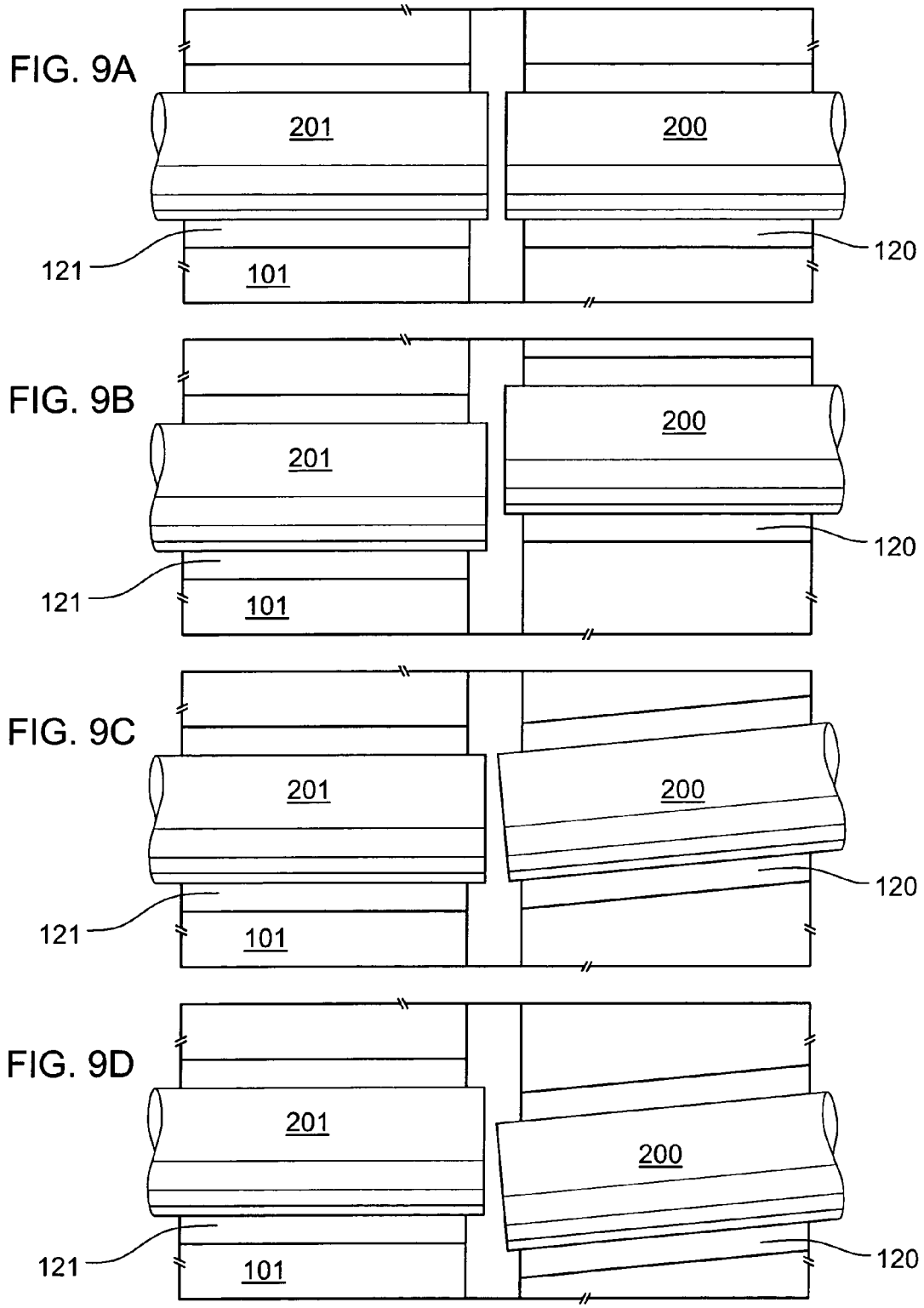

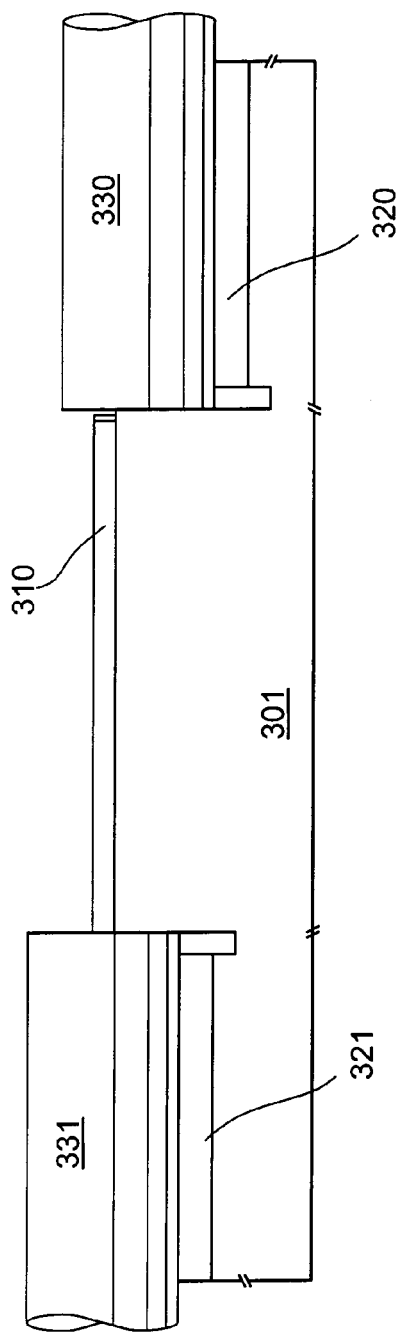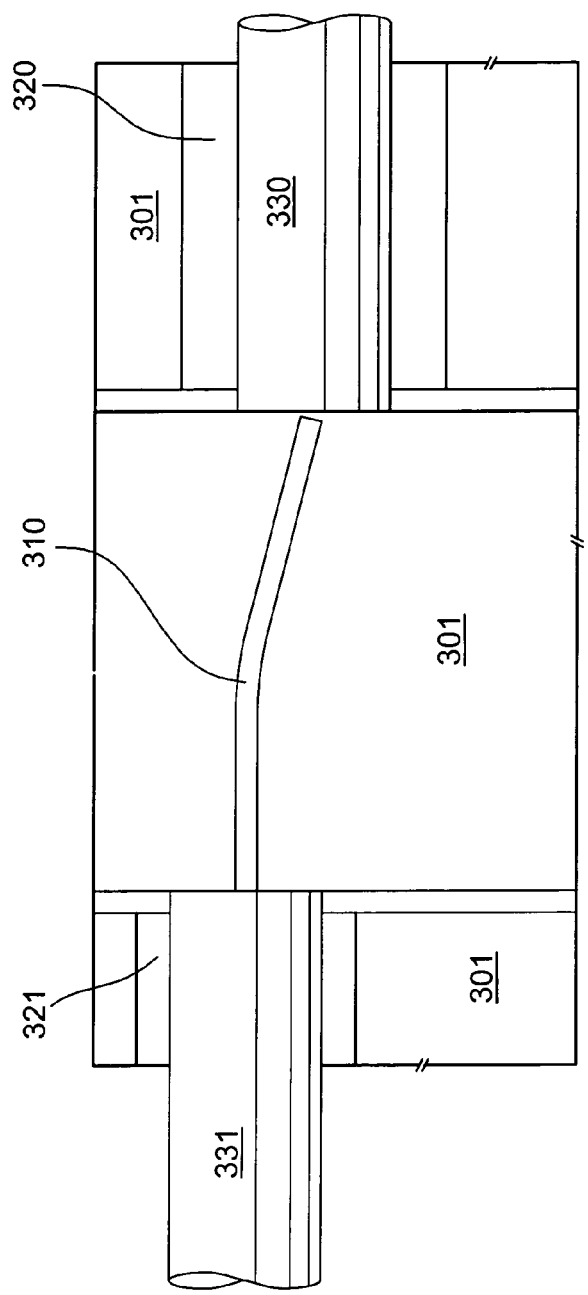

APPARATUS AND METHODS FOR LAUNCHING AN OPTICAL SIGNAL INTO MULTIMODE OPTICAL FIBER

BENEFIT CLAIMS TO RELATED APPLICATION

This application claims benefit of prior-filed co-pending provisional App. No. 60/536,176 entitled "Apparatus and methods for launching an optical signal into multimode optical fiber" filed Jan. 12, 2004 in the name of Henry A. Blauvelt, said provision application being incorporated by reference as if fully set forth herein. This application claims benefit of prior-filed co-pending provision App. No. 60/547,273 entitled "Apparatus and methods for launching an optical signal into multimode optical fiber" filed Feb. 24, 2004 in the names of Henry A. Blauvelt and David W. Vernooy, said provision application being incorporated by reference as if fully set forth herein.

BACKGROUND

The field of the present invention relates to optical fiber. In particular, apparatus and methods are described herein for launching an optical signal into multimode optical fiber.

Multimode optical fiber (MMF) is widely deployed in existing data transmission networks and systems. Transmission speeds (i.e., bandwidth or bit rate) through multimode fibers are typically limited by modal dispersion. In other words, different spatial modes supported by the multimode fiber propagate with different modal group velocities, leading to temporal spreading of an optical signal and limiting the speed at which data may be transmitted along the fiber. Such modal dispersion may be increased by deviations of the multimode fiber radial index profile from an ideal design index profile. Improvements in multimode fiber design and fabrication have resulted in fibers exhibiting reduced modal dispersion. However, there is interest in further increasing the usable bandwidth of such improved multimode fiber, and in increasing the bandwidth of previously-deployed multimode fiber in legacy fiber-optic networks, in which modal dispersion effects have become a limitation on transmission speed.

SUMMARY

The launch conditions (injected beam size and shape, radial offset from the multimode fiber axis, and angular offset relative to the multimode fiber axis) may be varied so as to preferentially excite various transverse modes of a multimode optical fiber. In order to reduce effects of multimode dispersion in the fiber, transverse modes are preferentially excited having smaller amplitudes near index profile defects of the multimode fiber.

The launch conditions may be readily controlled using a planar waveguide formed on a substrate along with a groove or other alignment structure for positioning and orienting the multimode fiber relative to the waveguide. The waveguide may be configured for providing the desired injected beam size and shape, while spatially selective material processing enables accurate positioning and orientation of the groove (and hence the multimode fiber) relative to the waveguide (yielding the desired radial and/or angular offsets). Such waveguide/groove implementations may be employed for constructing an in-line optical mode conditioner, a transmit optical subassembly (TOSA), and other optical devices, assemblies, and subassemblies that launch an optical signal into a multimode optical fiber. Alternatively, a substrate with two grooves may be used for positioning a single mode fiber and a multimode fiber for launching an optical beam from the single mode fiber into the multimode fiber under controlled launch conditions. The end of one or both fibers may be adapted for achieving the desired launch conditions.

Objects and advantages associated with launching optical signals into multimode optical fiber may become apparent upon referring to the disclosed exemplary embodiments as illustrated in the drawings and disclosed in the following written description and/or claims.

BRIEF DESCRIPTION OF THE DRAWINGS

FIGS. 1A-1C are end, side, and top views schematically illustrating an optical ray launched into a gradient-index multimode optical fiber.

FIGS. 2A-2C are end, side, and top views schematically illustrating an optical ray launched into a gradient-index multimode optical fiber.

FIGS. 3A-3C are end, side, and top views schematically illustrating an optical ray launched into a gradient-index multimode optical fiber.

FIGS. 4A-4C are end, side, and top views schematically illustrating an optical ray launched into a gradient-index multimode optical fiber.

FIGS. 5A-5C schematically illustrate circular (5A) and elliptical (5B, 5C) optical modes, launched into a multimode optical fiber.

FIGS. 6A-6C are end, side, and top views schematically illustrating an optical ray launched into a gradient-index multimode optical fiber.

FIGS. 7A-7C schematically illustrate pairs of optical modes (7A, 7B) or a higher-order mode (7C) launched into a multimode optical fiber.

FIGS. 9A-9D are top views schematically illustrating various launch conditions between a optical fibers mounted on a substrate.

FIGS. 16A-16B are side and top views schematically illustrating a planar waveguide mode conditioner coupling a single mode fiber and a multimode fiber.

Figure 8A:
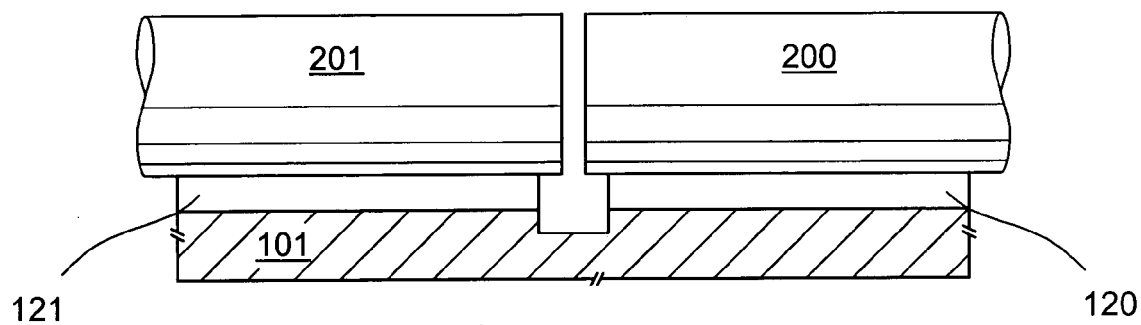
FIGS. 8A-8D are side views schematically illustrating various launch conditions between a optical fibers mounted on a substrate.
Figure 8B:
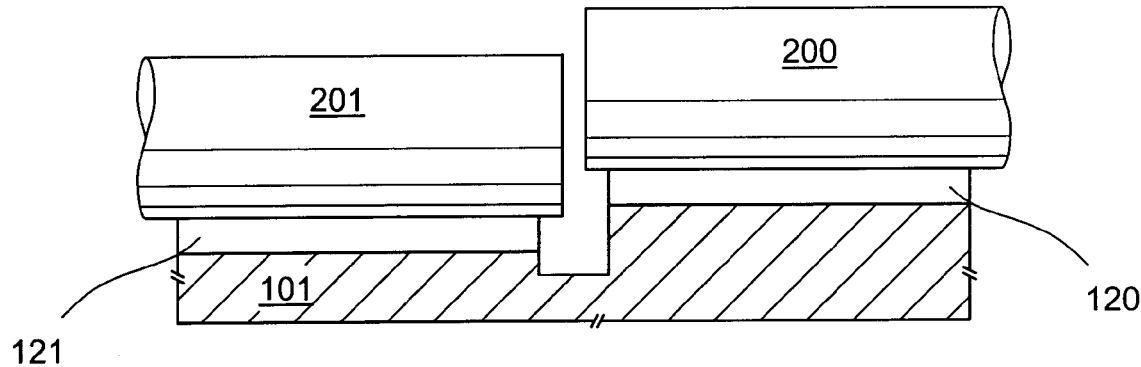
Figure 8C:
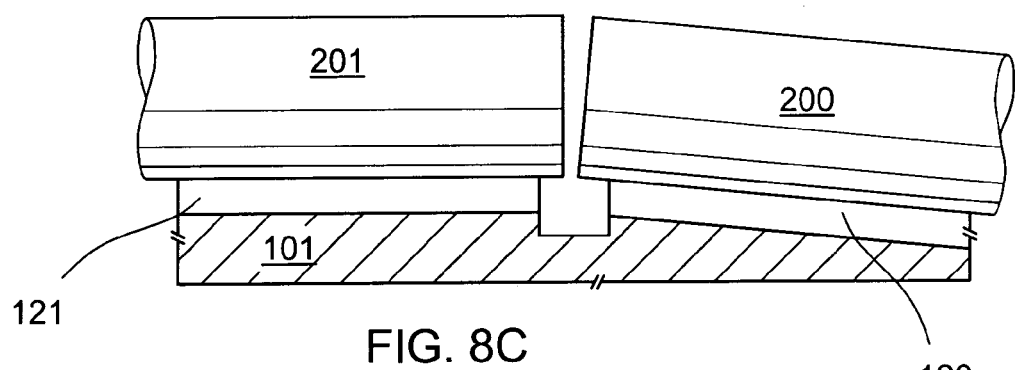
Figure 8D:
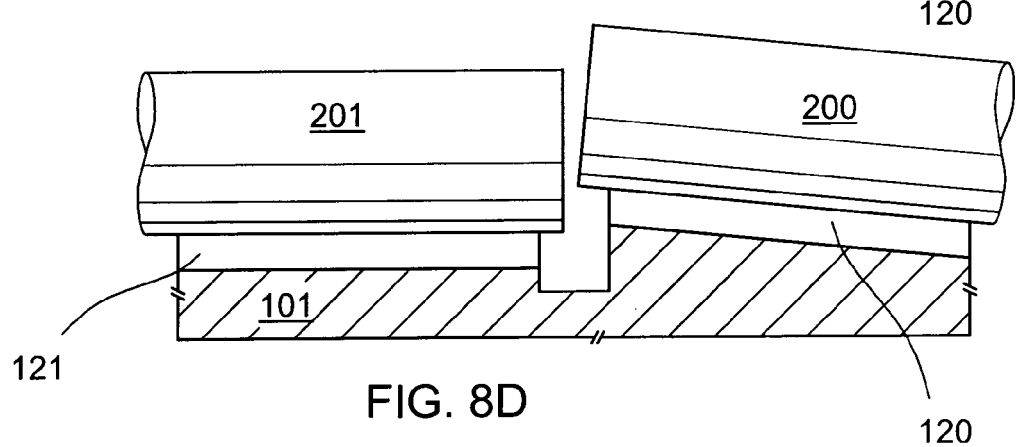

The embodiments shown in the Figures are schematic and exemplary, and should not be construed as limiting the scope of the present disclosure and/or appended claims. Relative proportions may be distorted for clarity.

DETAILED DESCRIPTION OF EMBODIMENTS

Typical multimode optical fiber comprises a core within a lower-index cladding, with the core typically exhibiting a radial index profile that is approximately quadratic. The core is typically between about 50 µm and about 62 µm in diameter, while the outer cladding diameter is typically about 125 µm. The apparatus and methods of the present disclosure may be implemented for any suitable core or cladding diameter, or any suitable radial index profile. The actual radial index profile of a multimode optical fiber typically deviates from an ideal profile. A center defect is a deviation of the actual index profile from the designed index profile (either too high or too low) at the center of the core (i.e., on the fiber axis) and extending a few microns radially from the axis. An edge defect is a deviation of the actual index profile from the designed index profile (either too high or too low) within a few microns of the outer edge of the core near the cladding. A third type of defect (referred to herein as a profile defect) is a deviation of the functional form of the actual radial index profile from the designed index profile. A given multimode fiber may exhibit one or more of these defects, resulting in increased modal dispersion.

The propagating modes supported by a multimode fiber are typically characterized by a radial mode number M (with $M \geq 1$) and an azimuthal mode number L. (It should be noted that the radial and azimuthal mode numbers were designated as N and M, respectively, in App. No. 60/536,176 cited hereinabove. The designations M and L of the present disclosure are consistent with usage more common in the literature.) A principal mode number m may be defined as $m = 2M + |L| + 1$. A given multimode optical fiber typically supports propagating transverse modes having m less than some cutoff value (m less than about 22 or 23 for 62 µm core multimode fiber, for example). Within that limitation, different index profile defects give rise to differing modal dispersion effects. A center defect tends to primarily affect the group velocity of modes with $L=0$ or $\pm 1$, i.e., modes with significant amplitude within a few microns of the fiber axis. Edge defects tend to primarily affect modes with m near the cutoff value, i.e., modes with significant amplitude within a few microns of the edge of the fiber core. Profile defects tend to produce a monotonic variation of group velocity with m. Modal dispersion effects in a given multimode fiber may therefore be reduced by preferential coupling of a launched optical signal beam into spatial modes of the multimode fiber: i) with $L \neq 0$ and $L \neq \pm 1$, thereby reducing the influence of a center defect; ii) with m well below the cutoff value for the fiber, thereby reducing the influence of an edge defect; and/or iii) having a relatively narrow distribution of m values, thereby reducing the influence of a profile defect.

Consider an injected optical beam launched from a single-mode fiber or waveguide into the multimode fiber, which will couple into a superposition of modes supported by the multimode fiber. In order to reduce effects of multimode dispersion, the launch conditions (injected beam size and shape, radial offset from the multimode fiber axis, and angular offset relative to the multimode fiber axis) may be manipulated so as to preferentially excite transverse modes of the multimode fiber having less amplitude near the fiber axis (i.e., substantially avoiding the $L=0$ and $L=\pm 1$ modes) and near the edge of the core (i.e., substantially avoiding modes with m near the multimode fiber cutoff), and/or having a relatively narrow distribution of m mode numbers. Launch conditions selected to address one or more of these conditions (or an operationally acceptable compromise among them) may reduce multimode dispersion effects in multimode fibers exhibiting a wide range of defects or combinations thereof.

The input beam being launched (i.e., injected or coupled) into the multimode fiber will encompass a range of propagation angles (due to its divergence, which varies in each dimension roughly inversely with its spot size in that dimension). If the launched beam is centered on the multimode fiber and launched substantially parallel to its axis, then modes having $L=0$ will be preferentially excited (i.e., will receive a substantial portion of the launched optical signal power). Modes having a range of radial mode numbers M will be excited, with the lowest-order mode ($M=1$) typically receiving the largest fraction of the launched optical power (but perhaps not a majority of the optical power). In a ray optics picture describing such launch conditions, a ray 10 launched into the multimode fiber (including core 20) at its center and parallel to its axis 21 will propagate along a path 12 coinciding with the fiber axis (FIGS. 1A-1C).

If the injected optical signal beam is radially offset from the multimode fiber axis and launched substantially parallel to the multimode fiber, then greater fractions of the launched optical signal power will be shifted to modes having larger radial mode numbers M. This may shift some of the propagating optical power away from the multimode fiber axis, but significant optical power still propagates near the multimode fiber axis. The radial offset may be kept sufficiently small so as to avoid substantial fractions of the injected optical signal being coupled into modes with m near the fiber cutoff. In a ray optics picture, a ray 10 launched into the core 20 of the multimode fiber parallel to and radially offset from the fiber axis 21 (FIGS. 2A-2C) will follow an oscillatory propagation path 12 that repeatedly crosses the fiber axis. A ray 10 launched at the center of the fiber core 20 with an angular offset exhibits similar behavior (FIGS. 3A-3C), as does a ray 10 launched into the fiber core 20 radially offset and angularly offset along a radial direction (FIGS. 4A-4C).

In addition to shifting launched optical signal power to modes having larger radial mode numbers M, radial offset of the launched beam 10' (FIG. 5A) also increases the fraction of optical signal power launched into modes having $L \neq 0$. The offset and divergence of the launched beam results in excitation of modes having a range of azimuthal mode numbers L. If the injected beam is launched parallel to the multimode fiber axis or angularly offset in the radial direction (as in FIGS. 2A-2C or 4A-4C), then the range of azimuthal mode numbers is centered about $L=0$, and the $L=0$ modes will have the largest amplitudes (although they may or may not carry a majority of the total optical signal power). Amplitude may be shifted away from the $L=0$ modes by increasing the divergence of the injected mode in the azimuthal direction (by reducing the injected beam size in the azimuthal direction). In other words, an elliptical injected beam 10' (FIG. 5B) may be launched into the core 20 of the multimode fiber, radially offset with the minor axis of the injected beam oriented along the azimuthal direction, for increasing the fraction of the injected optical signal coupled into modes having $L \neq 0$ (although the $L=0$ modes will still typically have the largest amplitudes). The azimuthal divergence may be kept sufficiently small so as to avoid substantial fractions of the injected optical signal being coupled into modes with m near the fiber cutoff. Shifting of injected optical signal power into modes with L≠0 shifts optical signal power away from the multimode fiber axis, potentially reducing multimode dispersion effects.

In addition to a radial offset, the injected optical mode may also be angularly offset in the azimuthal direction relative to the multimode fiber axis. Such an azimuthal angular offset shifts the center (and maximum) of the distribution of excited modes away from L=0, thereby shifting a larger fraction of the injected optical signal power away from the multimode fiber axis. A sufficiently large angular offset may result in substantial elimination of optical power from the L=0 and L=±1 modes. The azimuthal angular offset may be kept sufficiently small so as to avoid substantial fractions of the injected optical signal being coupled into modes with m near the multimode fiber cutoff. Reducing the divergence in the azimuthal dimension (by increasing the injected beam size in the azimuthal dimension, as in FIG. 5C) may enable substantial elimination of injected optical power in the L=0 and L=±1 modes at a smaller azimuthal angular offset, by decreasing the range of azimuthal mode numbers receiving injected optical power. In the rays optics picture, a ray 10 launched into a multimode fiber core 20 radially offset from the fiber axis 21 and angularly offset (in the azimuthal direction) relative to the fiber axis will follow a spiral propagation path 12 that never crosses the fiber axis. Such launch conditions may therefore be referred to as "spiral launch", as opposed to the "offset launch" conditions of FIGS. 2A-2C, 3A-3C, and 4A-4C. Viewed along the fiber axis, this spiral path will in general appear elliptical. The relative sizes of the radial and angular offsets (and the radial index profile) will determine whether the major axis of this ellipse is parallel to or perpendicular to the radial offset. For a given radial index profile and a given radial offset, a corresponding angular offset may typically be calculated which results in a circular spiral ray propagation path (as in FIGS. 6A-6C).

The degree to which modal dispersion effects are reduced depends on i) the radial index profile of the multimode fiber and the nature and magnitude of its defects, ii) the size and shape of the optical input beam being launched into the multimode fiber, and iii) the lateral and/or angular offset(s). It is generally (but not always) the case that a launched optical beam which is offset by larger distance and angle (in the azimuthal direction) from the multimode fiber axis has less optical power propagating near the fiber axis, and therefore exhibits smaller multimode dispersion. However, an offset (radial or angular) that is too large may result in increased modal dispersion due to propagating amplitude near the edge of the core, relatively poor overall coupling into the multimode fiber, and/or loss of transmitted optical power. For a given multimode fiber, an optimum set of launched beam size and shape, radial offset, and/or angular offset may be found balancing the desires for increased transmission bandwidth (i.e., reduced multimode dispersion) and low optical loss, for example minimizing multimode dispersion effects while maintaining optical loss below some predetermined operationally acceptable level. Such optimization may be achieved by calculation, modeling, and/or simulation, if the index profile of the multimode fiber is known with sufficient precision. If the index profile of the multimode fiber is not known with sufficient precision, such optimization may be achieved empirically. In cases wherein the launched beam size and/or shape may not be easily altered, radial and/or angular offsets may still be optimized. It has been observed that multiple combinations of launch parameters may result in optimal reduction of multimode dispersion for a given multimode fiber. Instead of optimizing launch conditions for each type of multimode fiber, it may be desirable to choose a single set of launch conditions that may yield operationally acceptable reductions in modal dispersion for many, or even most, multimode fibers likely to be encountered. It should be noted that while "reduction of modal dispersion" is discussed herein, this may be characterized qualitative or quantitatively in a variety of ways. One quantitative measurement related to modal dispersion is the bandwidth-distance product, typically specified for each type of multimode optical fiber and expressed in units of MHz-km or GHz-km. Other figures-of-merit may be employed for characterizing modal dispersion, and some are under discussion by various industry standards groups. Any suitable figure-of-merit for characterizing modal dispersion or an operationally acceptable level thereof shall fall within the scope of the present disclosure or appended claims.

Many commercially available gradient-index multimode fibers, including multimode fiber deployed in legacy networks, are specified to exhibit a transmission bandwidth greater than or equal to about 400 or 500 MHz-km at transmission wavelengths around 1300 nm. Examples or such legacy multimode optical fibers may include A1a.1, A1a.2, and A1b fibers described in the IEC 60793-2-10 standards document; many other examples of legacy multimode optical fiber exist, and any may employed within the scope of the present disclosure or appended claims. The bandwidth specification typically assumes an overfilled launch condition (i.e., nearly all optical modes supported by the multimode optical fiber, including modes with significant amplitude near index defects, receive a portion of the launched optical signal). Such a launch condition typically results in unacceptably high optical loss upon launch, and typical single mode sources, such as single mode fiber, are not well-suited for overfilling the multimode fiber. Launching of a single mode beam, from a single mode fiber or other single mode source, may be less lossy than an overfilled launch and may in some instances achieve the bandwidth specification. However, in other instances a launched single mode may in fact exhibit a decreased bandwidth (relative to an overfilled launch) due to variations in the launch conditions leading to variations in the distribution of modes receiving fractions of the injected optical signal. Radial offset of an injected beam from a single mode source by more than about its beam radius ($1/e^2$ of maximum intensity half width in the radial offset direction), together with angular offset in the azimuthal direction of such an injected beam by more than about its divergence half angle (half maximum intensity half width in the azimuthal direction), may result in an operationally significant reduction of modal dispersion. Increasing the radial offset to about 1.5 to 2 times the injected beam radius typically results in operationally significant reduction of modal dispersion. Expanding the injected beam in the azimuthal dimension (thereby decreasing the corresponding divergence) may result in further reduction of modal dispersion. Note that injected optical beam size, shape, divergences, radial position, and angular offset (i.e., propagation direction) are defined just within the multimode fiber entrance face, and that refraction upon entering the multimode fiber end face must be accounted for in designing an optical system for achieving the desired launch conditions. Many different combinations of launch conditions may yield decreased multimode dispersion and improvement of the multimode fiber transmission bandwidth in the presence of various multimode fiber index defects or combinations thereof.

Multiple injected single beams may be employed for preferential excitation of desired modes of the multimode fiber. The relative phases of the injected beams must be controlled to yield the desired coupling. For example, two substantially identical injected beams may be launched into a multimode fiber core 20 at diametrically opposed radially offset positions. If the two injected beams 10' have the same phase (FIG. 7A), then only modes having even L are excited, including L=0 modes. However, if the two injected modes 10' have a relative phase of π (FIG. 7B), then only modes having odd L will be excited. Exclusion of the L=0 modes may somewhat reduce the fraction of optical signal amplitude propagating near the axis of the multimode fiber. Alternatively, L=0 modes of the multimode fiber may be substantially excluded by launching a single-mode beam having one or more nodal planes. The foregoing examples have shown injected beams lacking any nodal planes (i.e., beams arising from the only mode supported of a single-mode injection waveguide). By injecting a beam having a nodal plane (as in FIG. 7C, showing a first order mode 11' of a multimode injection waveguide having a single nodal plane), excitation of L=0 fiber modes may be substantially eliminated, somewhat reducing the fraction of the injected optical signal power propagating near the fiber axis. Still higher order injected modes, having larger numbers of nodal planes, may be similarly employed for substantially eliminating excitation of other modes and enabling further reduction in modal dispersion.

Guided by the general principles set forth hereinabove, one skilled in the art may determine launch conditions, i.e., combinations of beam size, beam shape, radial offset, and/or azimuthal angular offset that yield operationally acceptable levels of multimode dispersion effects and/or optical loss for an optical signal launched into a given multimode fiber. However, it will be appreciated that achieving alignment within the tolerances required for reproducibly achieving such optimized launch parameters may be difficult. Such precision alignment may be readily enabled by the use of alignment substrates with precision grooves (including V-grooves) and/or other alignment structures for positioning and aligning optical fibers. Such substrates may also include one or more planar waveguides formed thereon for launching optical signals into multimode fibers.

A substrate 101 may be fabricated with a pair of grooves 121 and 120 for mounting, respectively, a single-mode launch fiber 201 and a multimode receiving fiber 200 (FIGS. 8A-8D and 9A-9D). The optical fibers mounted in the grooves would be positioned and aligned for end coupling, with a single mode beam emerging from the single mode fiber and entering the multimode fiber. The position and alignment of the grooves determine the relative alignment of the optical fibers and determine the launch conditions. The end faces of the fibers may also be modified to yield the desired launch conditions. Grooves in the substrate may be: formed to position the fiber ends at a common height relative to the substrate (FIGS. 8A and 8C), or vertically offset from one another (FIGS. 8B and 8D); formed to align both fibers parallel to the substrate surface (FIGS. 8A and 8B) or to align one or both fibers tilted vertically relative to the substrate surface (FIGS. 8C and 8D; either single mode fiber 201 or multimode fiber 200 may be tilted with respect to the substrate surface); formed parallel to one another in the horizontal dimensions (i.e., the dimensions parallel to the substrate surface; FIGS. 9A and 9B) or horizontally tilted relative to one another (FIGS. 9C and 9D); formed to position the fiber ends at a common lateral position (FIGS. 9A and 9C) or laterally offset from one another (FIGS. 9B and 9D). Combinations of these vertical and horizontal/lateral groove configurations (and the resulting combinations of relative fiber positions and relative alignment) enable any combination of radial offset and angular offset (radial and/or azimuthal) to be reliably achieved.

Any suitable substrate material(s) may be employed for forming substrate 101 (including but not limited to semiconductors, ceramics, glasses, crystalline materials, dielectrics, plastics, polymers, metals, combinations thereof, and/or equivalents thereof), and grooves 120 and 121 may be formed using any sufficiently accurate spatially selective material processing technique(s). Relative angles for the grooves are chosen to yield the desired launch angles inside the multimode fiber, and must take into account refraction (if any) as an optical beam leaves the single mode fiber and enters the multimode fiber. If index matching material is employed between the fiber ends, such refraction may be reduced or substantially eliminated. Grooves parallel to the substrate surface may be readily formed using a variety of spatially selective material processing techniques, including but not limited to lithographic techniques. Grooves tilted vertically may be formed lithographically using gray scale lithography, using multiple lithographic steps (for forming a stepped groove), or using other more specialized techniques. Groove orientations and/or tilts may be constrained by crystal planes of the substrate material in some instances (wet etching of a single crystal substrate, for example), while in other cases the groove orientations and/or tilts may be arbitrarily chosen (examples may include molding or machining, dry etching, use of amorphous substrate materials, and so forth). So-called silicon optical bench methodologies may be well-suited for forming alignment substrates as shown in FIGS. 8A-8D and 9A-9D.

Figure 10A:
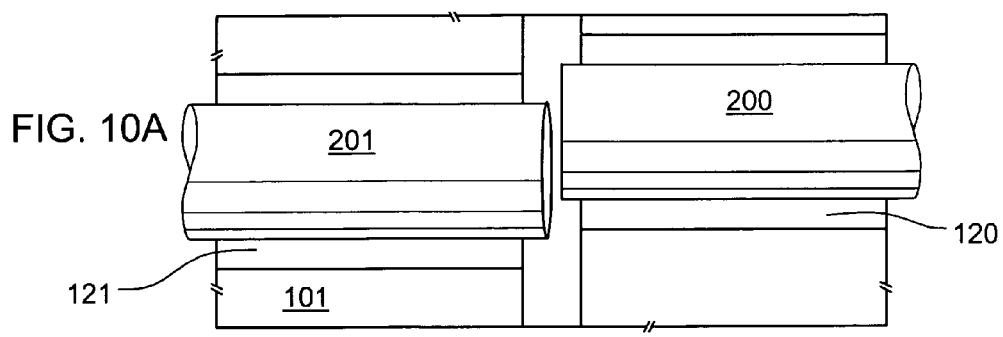
FIGS. 10A-10B are top and side views, respectively, schematically illustrating launch conditions between a optical fibers mounted on a substrate.
Figure 10B:
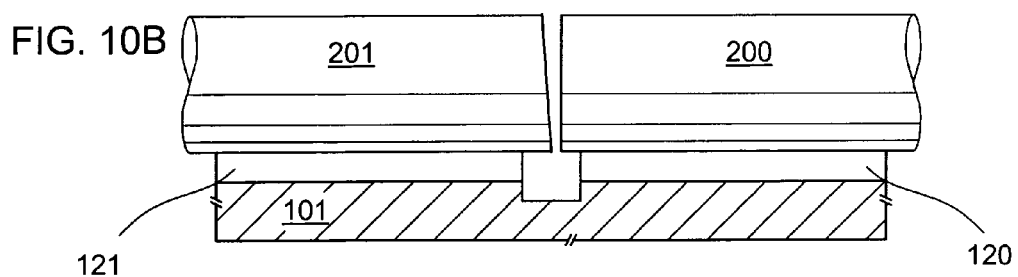
Figure 11A:
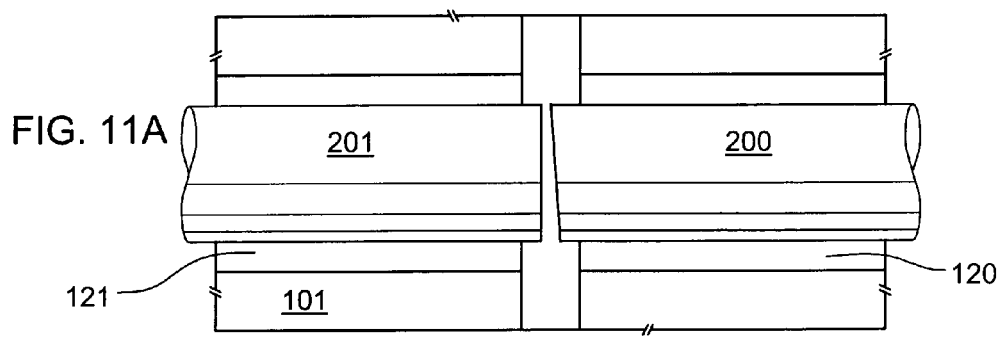
FIGS. 11A-11B are top and side views, respectively, schematically illustrating various launch conditions between a optical fibers mounted on a substrate.
Figure 11B:
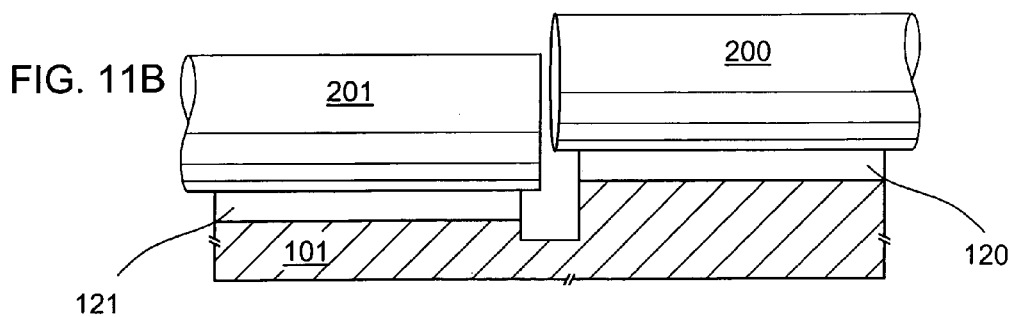

The end of one or both optical fibers may be suitably modified for achieving the desired launch conditions. For example, as shown in FIGS. 10A-10B and 11A-11B, one of the fibers may have an angled end face (cleaved and/or polished), with refraction at the angled end face resulting in an angular offset for the launched optical beam. In FIGS. 10A-10B, lateral displacement of the multimode fiber 200 and single mode fiber 201 results in a radial offset, while refraction at the angled end face of single mode fiber 201 results in an azimuthal angular offset. In FIGS. 11A-11B, vertical displacement of the fibers 200 and 201 results in a radial offset for the launched mode, while refraction at the end face of multimode fiber 200 results in an azimuthal angular offset for the launched mode. These are only two examples among numerous suitable combinations of vertical and/or lateral displacement and angled fiber end face(s) that may be employed for achieving desired launch conditions. If refraction is to be relied on, index matching material is generally not employed. This may result reflective losses at the fiber end faces, or an anti-reflection coating may be employed on one or both fiber end faces if needed or desired. In addition to the alignment achieved by placement of the fibers in the grooves, use of an angled end face also necessitates proper rotational alignment of an angled fiber within it groove, to achieve the correct orientation of the angled fiber end face relative to the other fiber. Instead of a flat end face (angled or not), one or both fiber end faces may be shaped to yield desirable beam characteristics. Curved, conical, or other shapes for the fiber end faces may be formed according to the teachings of Presby et al, for example (H. M. Presby, A. F. Benner, and C. A. Edwards, "Laser micromachining of efficient fiber microlenses", Applied Optics Vol 29(18) 2692 (1990)).

Figure 12A:
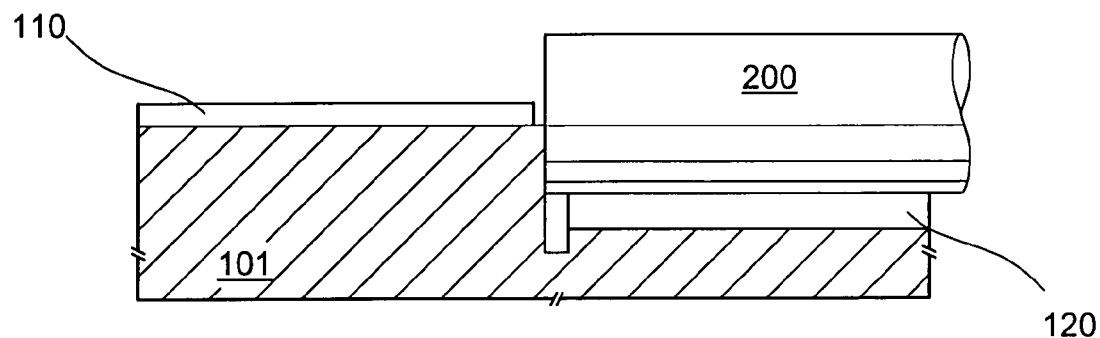
FIGS. 12A-12D are side views schematically illustrating various launch conditions between a planar waveguide and an optical fiber on a substrate.
Figure 12B:
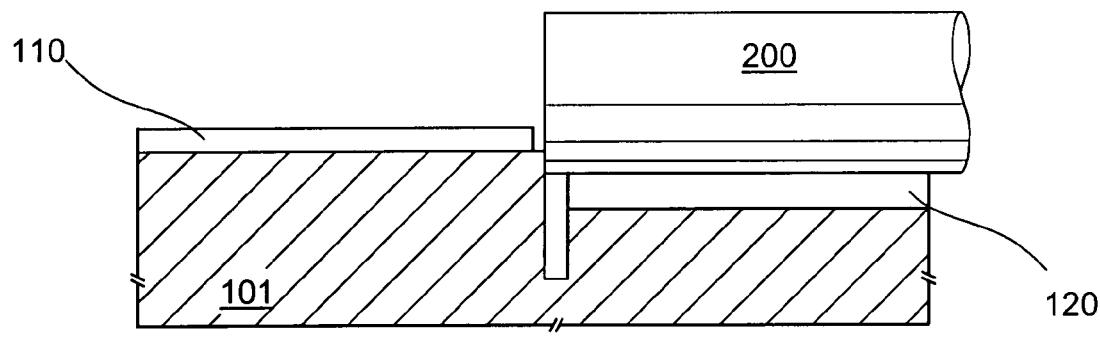
Figure 12C:
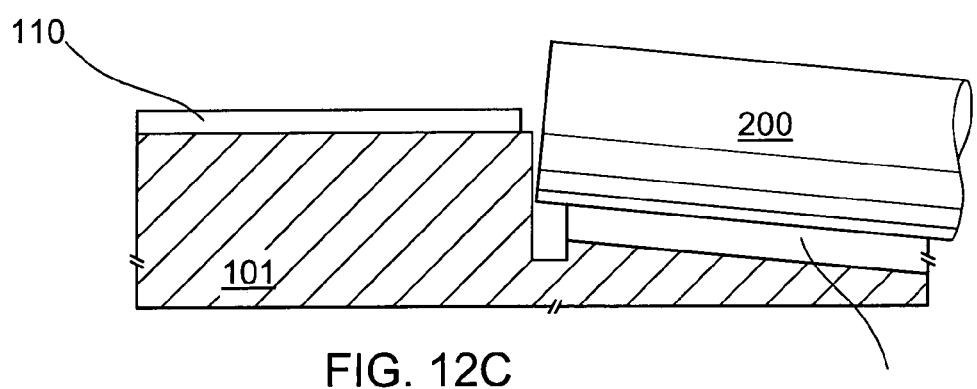
Figure 12D:
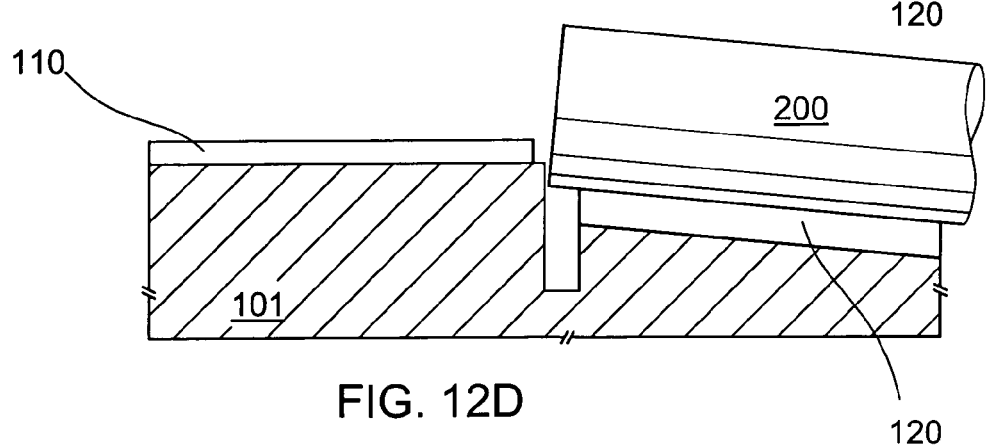
Figure 13A:
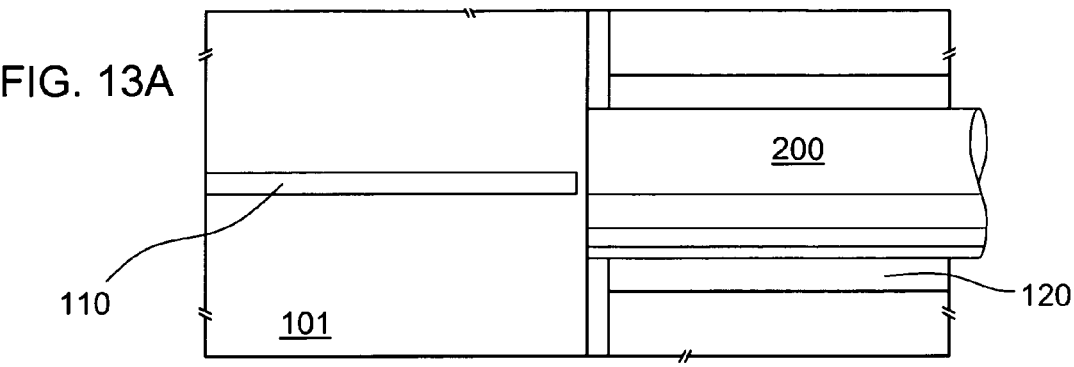
FIGS. 13A-13D are top views schematically illustrating various launch conditions between a planar waveguide and an optical fiber on a substrate.
Figure 13B:
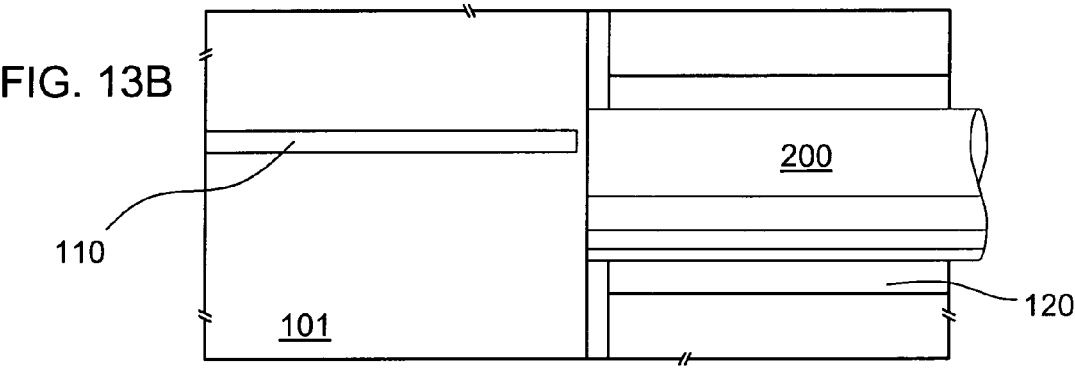
Figure 13C:
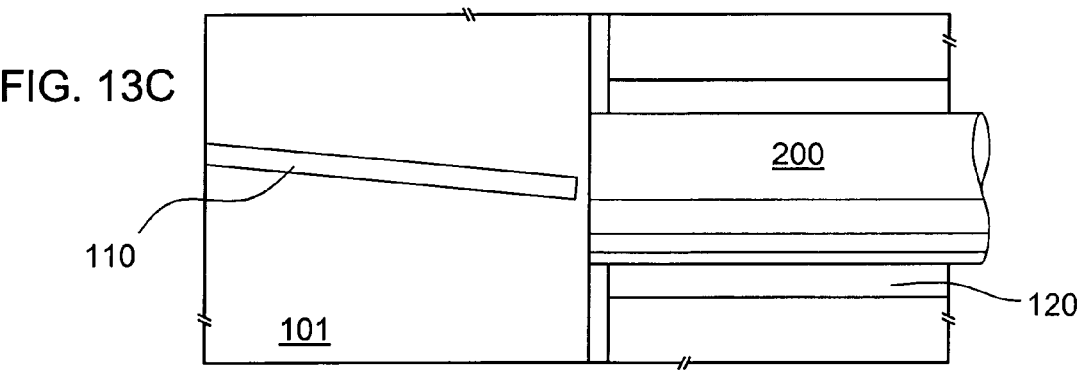
Figure 13D:
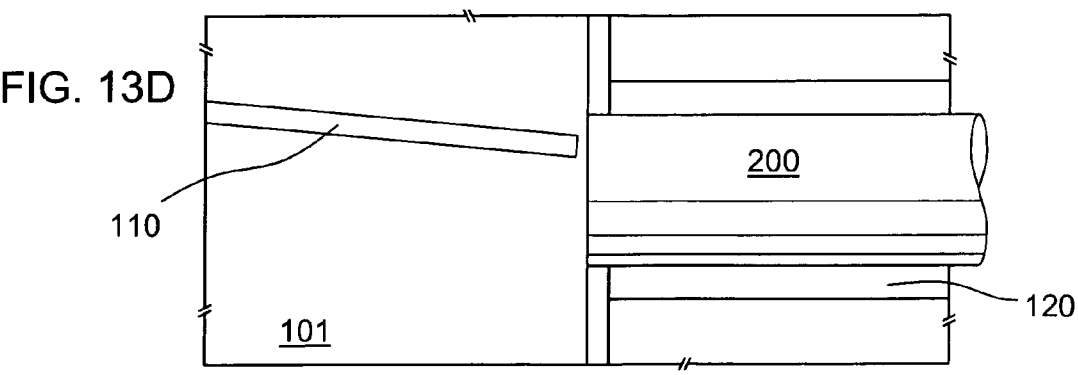

Instead of launching an optical beam from a single mode fiber, a planar waveguide 110 may be formed on substrate 101 for launching an optical beam into multimode fiber 200 in groove 120. The groove and the waveguide may be: formed to position the fiber and waveguide ends at a common height relative to the substrate (based on mode positions in each of the waveguide and fiber; FIGS. 12A and 12C), or vertically offset from one another (FIGS. 12B and 12D); formed to align the fiber parallel to the substrate surface (FIGS. 12A and 12B) or to align the fiber tilted vertically relative to the substrate surface (FIGS. 12C and 12D); formed parallel to one another in the horizontal dimensions (i.e., the dimensions parallel to the substrate surface; FIGS. 13A and 13B) or horizontally tilted relative to one another (FIGS. 13C and 13D); formed to position the fiber and waveguide ends at a common lateral position (based on mode positions, or equivalently optical propagation axes, in each; FIGS. 13A and 13C) or laterally offset from one another (FIGS. 13B and 13D). Combinations of these vertical and horizontal/lateral waveguide/groove configurations (and the resulting combinations of relative alignment and position of the fiber and waveguide) enable any combination of radial offset and angular offset (radial and/or azimuthal) to be reliably achieved. By analogy with FIGS. 10A-10B and 11A-11B and the accompanying descriptions, one or both of the end faces of waveguide 110 and multimode fiber 200 may be angled or otherwise modified or shaped to yield desired launch conditions. Index matching material and/or anti-reflection coatings may or may not be employed, as needed or desired.

Various waveguide core configurations, and various waveguide core and cladding material combinations, may be employed for achieving desired injected beam size and shape. For example, the elliptical injected beam shapes shown in FIGS. 5B and 5C may be readily produced with a properly designed planar waveguide. By varying the planar waveguide sufficiently gradually along its length (i.e., substantially adiabatically), most desired beam sizes and/or shapes may be obtained for injection into the multimode waveguide without introducing unacceptable levels of optical loss. A single-mode waveguide may typically be employed, although a multimode waveguide may be suitably employed under some conditions. Some examples of suitable planar waveguides may be found in prior-filed U.S. provisional Appl. No. 60/466,799 filed Apr. 29, 2003, prior-filed U.S. non-provisional application Ser. No. 10/609,018 filed Jun. 27, 2003, and prior-filed U.S. non-provisional application Ser. No. 10/836,641 filed Apr. 29, 2004, each of said applications being hereby incorporated by reference as if fully set forth herein. Other suitable planar waveguide types or configurations may be employed as well, and shall fall within the scope of the present disclosure and/or appended claims. Injected beam sizes may typically range between about 1 µm and about 10 µm, 15 µm, or even 20 µm in diameter (at typical visible and near-IR wavelengths employed for fiber-optic telecommunications), and may differ in the two transverse dimensions. Spatially selective material processing may be employed for forming injection waveguides and grooves or other alignment structures in precise relative positions and orientations, limited only by the accuracy of the lithographic or other processes employed. Sub-micron alignment accuracy may be routinely achieved using many standard spatially-selective material processing techniques. A groove for receiving the end of a multimode fiber and a single-mode injection waveguide may be formed together on a common waveguide substrate. The core of the injection waveguide may be engineered to yield the desired beam size and shape at its end, while the depth and angle of the groove relative to the waveguide are engineered to yield the proper radial and/or angular displacements for the multimode fiber seated in the groove. Once a particular set of launch conditions are established for a given multimode fiber, those conditions may be readily implemented, and reliably and reproducibly achieved, by fabrication of a suitably designed planar waveguide substrate 101 with the injection waveguide 110 and a groove 120 for receiving the multimode fiber 200, and subsequent mounting of the multimode fiber on the waveguide substrate seated in the groove. Multiple such structures may be fabricated concurrently on a common substrate wafer using spatially selective material processing applied on a wafer scale.

Figure 14A:
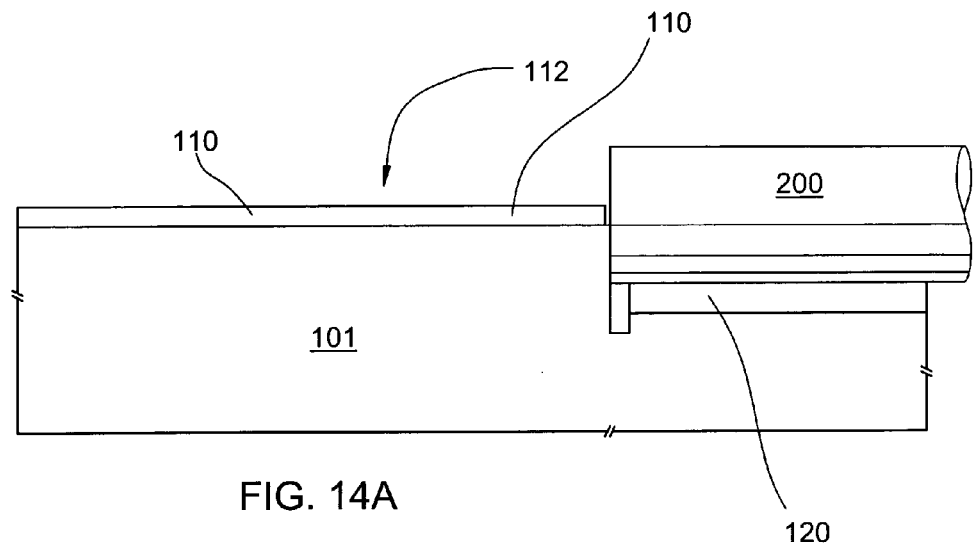
FIGS. 14A-14B are side and top views schematically illustrating a pair of planar waveguides on a substrate launching optical modes into a multimode optical fiber seated in a groove on the substrate.
Figure 14B:
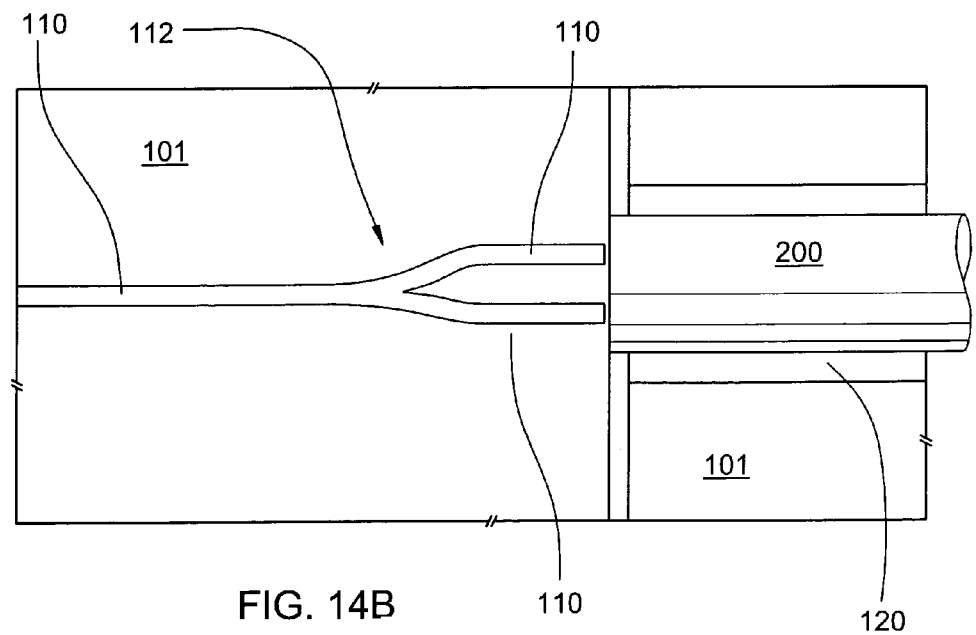

A planar waveguide 110 may also be employed when multiple injection beams are employed, requiring precise control of the relative phases of the injected beams launched into the multimode fiber 200. The waveguide 110 may include an optical splitter 112 for dividing the optical signal into separate components (exemplary embodiment of FIGS. 14A-14B). The waveguide may also be engineered to produce the desired beam sizes and shapes for launching into the multimode fiber 200, seated in groove 120 on substrate 101. Such beam conversion may occur before or after the signal is divided. The optical paths from the splitter through the injection waveguides to the multimode fiber are arranged to yield the desired relative phase of the injected beams (usually an odd multiple of $\pi$ to reduce modal dispersion in the multimode fiber, similar to FIG. 7B). Sufficiently accurate design and fabrication of the waveguides and use within a restricted range of wavelengths may enable use of the splitter and injection waveguides in a passive manner.

Figure 15A:
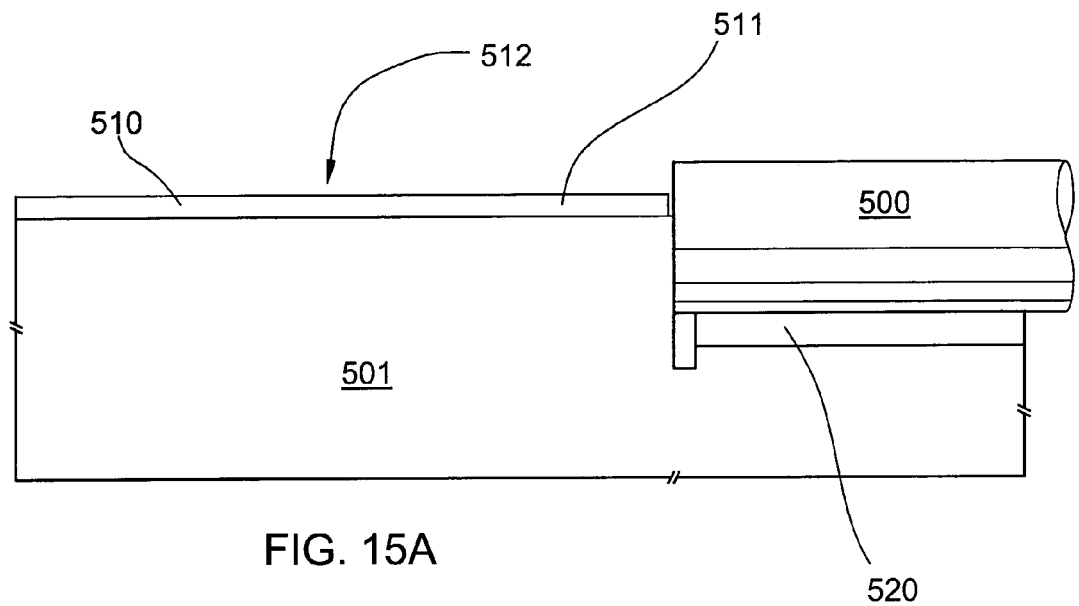
FIGS. 15A-15B are side and top views schematically illustrating a planar waveguide on a substrate launching an optical mode into a multimode optical fiber seated in a groove on the substrate.
Figure 15B:
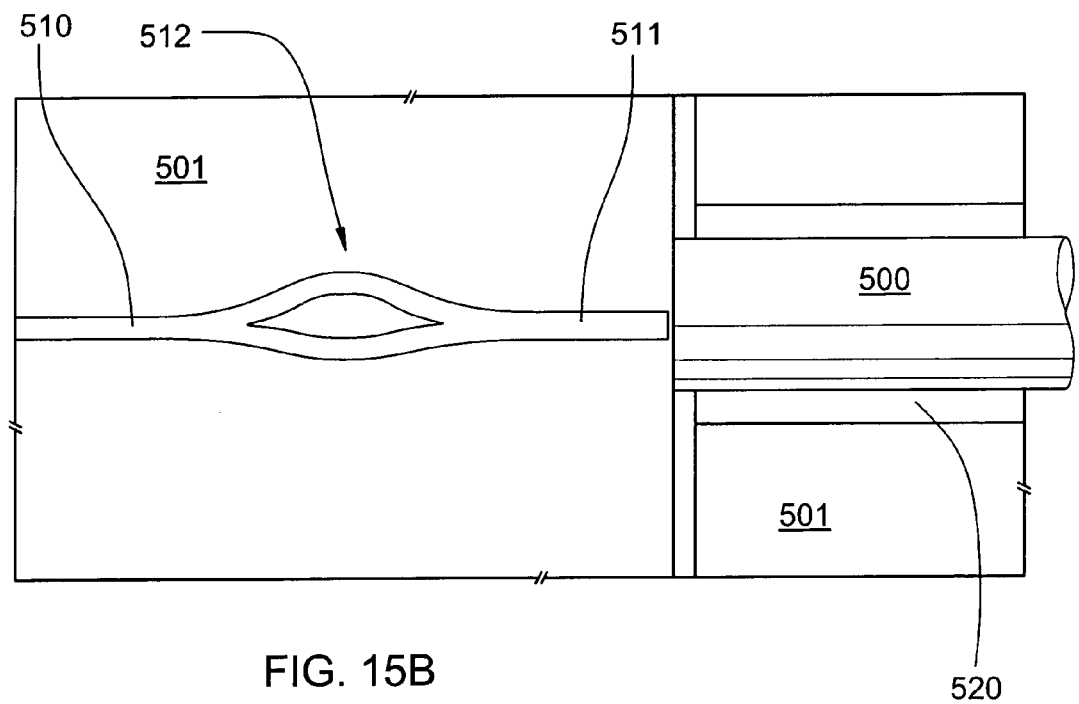

The exemplary embodiment of FIGS. 15A-15B may be employed for launching an injected beam having a nodal plane. An optical signal propagates along single mode waveguide 510 (formed on substrate 501), enters splitter/recombiner 512, and exits via waveguide 511. Splitter/recombiner 512 is configured (actively or passively, as described above) for providing a $\pi$ phase shift between the split components of the optical signal before they are recombined. Waveguide 511 is configured to support at least one first-order optical mode (having a nodal plane) in addition to a zero-order mode. The split single modes, recombined with a $\pi$ phase shift, couple primarily into the first-order mode. This first-order mode is launched into the multimode fiber 500 (seated in groove 520) in a manner similar to FIG. 7C. The nodal plane of the injected mode, when oriented along the radial offset direction, results in little or no coupling into L=0 modes of the multimode fiber, thereby reducing multimode dispersion effects (as described above). Additional splitters/recombiners may be employed for generating still higher-order injected optical modes for further reduction of modal dispersion.

The various configurations for launching an optical signal into a multimode fiber from a single-mode planar waveguide may be employed in a variety of optical assemblies and subassemblies. For example, a stand-alone mode conditioner may comprise a waveguide substrate 301 with a waveguide 310 and grooves 320 and 321 thereon (FIGS. 16A and 16B). A single-mode fiber 331 is received in groove 321, and an optical signal transmitted by the single-mode fiber is optically coupled into waveguide 310. Waveguide 310 may be adapted at this first end for substantially spatial-mode matched end-coupling with single-mode fiber 331. The transverse dimensions of the core of waveguide 331 may vary gradually along its length, so that as the optical signal propagates along waveguide 310 it may be converted to a spatial mode suitable for launching into multimode fiber 330 (as described hereinabove; FIGS. 5A-5C for example). Multimode fiber 330 is received within groove 320, which is positioned and oriented relative to the second end of waveguide 310 as described hereinabove, for achieving launch conditions yielding operationally acceptable levels of modal dispersion and optical loss. Any suitable arrangement of the grooves 320/321, fibers 330/331, and waveguide 310 may be employed for implementing such a mode conditioner within the scope of the present disclosure and/or appended claims. Such a mode conditioner may, for example, be integrated into a patch cord or other in-line optical assembly for insertion into an optical fiber transmission system. Such a mode conditioner may be suitable, for example, for upgrading an optical transmission system comprising previously installed legacy multimode fiber to accommodate higher transmission rates.

Figure 17A:
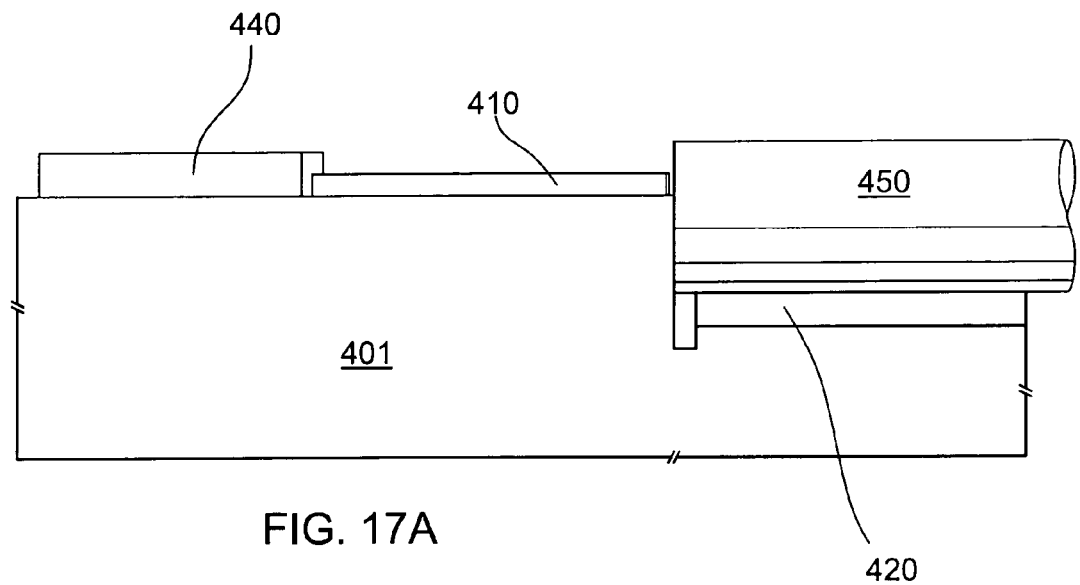
FIGS. 17A-17B are side and top views schematically illustrating a transmit optical assembly coupled to a multimode optical fiber.
Figure 17B:
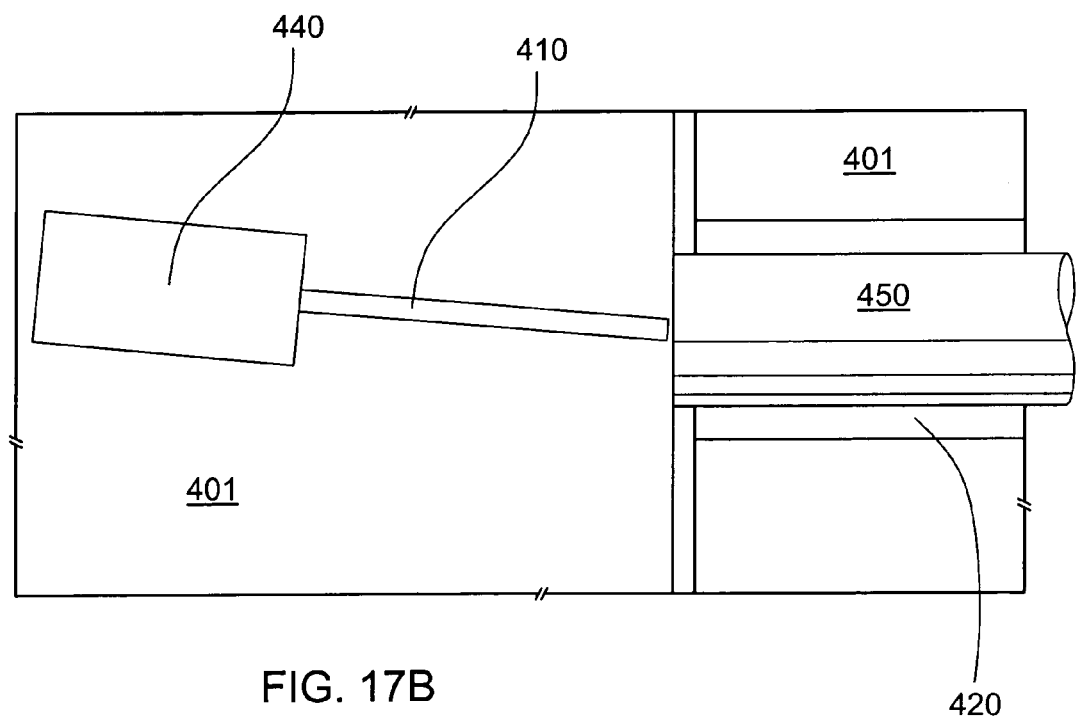

In another example (FIGS. 17A and 17B), a transmit optical subassembly (TOSA) may comprise a laser source 440, and perhaps other optical components and/or devices, mounted on a planar waveguide substrate 401 along with a planar waveguide 410 formed on the substrate. After transfer from the laser 440 by any suitable means into waveguide 410 (described further hereinbelow), the optical output of the laser propagates along the planar waveguide 410, which may vary along its length to convert the spatial mode of the laser output into a beam suitable for launching into a multimode fiber (in any suitable way, including those described hereinabove). A groove 420 is formed in substrate 401 positioned and oriented elative to the waveguide 410 (in any of the ways described hereinabove) for achieving launch conditions yielding operationally acceptable levels of optical loss and modal dispersion for the laser output as it propagates along the multimode optical fiber 450. Additional optical devices or components may be included along with laser source 440 and waveguide 440, so that the overall device may comprise a TOSA, a bidirectional device, a transceiver, or other optical apparatus.

Free-space optics may also be employed for launching an optical beam into a multimode waveguide with radial displacement and angular offset (including azimuthal angular offset) for reducing modal dispersion. Any suitable combination of lenses (spherical, aspheric, and/or cylindrical), prisms, mirrors, other optical imaging components, and so forth may be employed for relaying an optical signal from a source (laser, fiber, waveguide, and so forth) into the end face of a multimode fiber, with radial displacement, angular offset (including azimuthal offset), and/or beam size/shape for reducing modal dispersion effects in the multimode fiber. Such a free space fiber launch assembly may be employed in a TOSA or bidirectional device, for example, for relaying the output of a laser diode into a multimode fiber with the desired launch conditions.

The term "optical waveguide" (or equivalently, "waveguide") as employed herein shall denote a structure adapted for supporting one or more optical modes. Such waveguides shall typically provide confinement of a supported optical mode in two transverse dimensions while allowing propagation along a longitudinal dimension. The transverse and longitudinal dimensions/directions shall be defined locally for a curved waveguide; the absolute orientations of the transverse and longitudinal dimensions may therefore vary along the length of a curvilinear waveguide, for example. Examples of optical waveguides may include, without being limited to, various types of optical fiber and various types of planar waveguides. The term "planar optical waveguide" (or equivalently, "planar waveguide") as employed herein shall denote any optical waveguide that is provided on a substantially planar substrate. The longitudinal dimension (i.e., the propagation dimension) shall be considered substantially parallel to the substrate. A transverse dimension substantially parallel to the substrate may be referred to as a lateral or horizontal dimension, while a transverse dimension substantially perpendicular to the substrate may be referred to as a vertical dimension. Examples of such waveguides include ridge waveguides, buried waveguides, semiconductor waveguides, other high-index waveguides ("high-index" being above about 2.5), silica-based waveguides, polymer waveguides, other low-index waveguides ("low-index" being below about 2.5), core/clad type waveguides, multi-layer reflector (MLR) waveguides, metal-clad waveguides, air-guided waveguides, vacuum-guided waveguides, photonic crystal-based or photonic bandgap-based waveguides, waveguides incorporating electro-optic (EO) and/or electro-absorptive (EA) materials, waveguides incorporating non-linear-optical (NLO) materials, and myriad other examples not explicitly set forth herein which may nevertheless fall within the scope of the present disclosure and/or appended claims. Many suitable substrate materials may be employed, including semiconductor, crystalline, silica or silica-based, other glasses, ceramic, metal, and myriad other examples not explicitly set forth herein which may nevertheless fall within the scope of the present disclosure and/or appended claims.

One exemplary type of planar optical waveguide that may be suitable for use with optical components disclosed herein is a so-called PLC waveguide (Planar Lightwave Circuit). Such waveguides typically comprise silica or silica-based waveguides (often ridge or buried waveguides; other waveguide configuration may also be employed) supported on a substantially planar silicon substrate (often with an interposed silica or silica-based optical buffer layer). Sets of one or more such waveguides may be referred to as planar waveguide circuits, optical integrated circuits, or opto-electronic integrated circuits. A PLC substrate with one or more PLC waveguides may be readily adapted for mounting one or more optical sources, lasers, modulators, and/or other optical devices adapted for end-transfer of optical power with a suitably adapted PLC waveguide. A PLC substrate with one or more PLC waveguides may be readily adapted (according to the teachings of U.S. Pat. App. Pub. No. 2003/0081902, U.S. provisional App. No. 60/466,799, U.S. non-provisional application Ser. No. 10/609,018, and U.S. non-provisional application Ser. No. 10/836,641, each hereby incorporated by reference as if fully set forth herein) for mounting one or more optical sources, lasers, modulators, photodetectors, and/or other optical devices adapted for transverse-transfer of optical power with a suitably adapted PLC waveguide (mode-interference-coupled, or substantially adiabatic, transverse-transfer; also referred to as transverse-coupling).

For purposes of the foregoing written description and/or appended claims, "spatially-selective material processing techniques" shall encompass epitaxy, layer growth, lithography, photolithography, evaporative deposition, sputtering, vapor deposition, chemical vapor deposition, beam deposition, beam-assisted deposition, ion beam deposition, ion-beam-assisted deposition, plasma-assisted deposition, wet etching, dry etching, ion etching (including reactive ion etching), ion milling, laser machining, spin deposition, spray-on deposition, electrochemical plating or deposition, electroless plating, photo-resists, UV curing or densification, micro-machining using precision saws and/or other mechanical cutting or shaping tools, selective metallization and/or solder deposition, chemical-mechanical polishing for planarizing, molding, pressing, stamping, embossing, any other suitable spatially-selective material processing techniques, combinations thereof, or functional equivalents thereof. In particular, it should be noted that any step involving "spatially-selectively providing" a layer or structure may involve either or both of: spatially-selective deposition or growth, or substantially uniform deposition or growth (over a given area) followed by spatially-selective removal. Any spatially-selective deposition, removal, or other process may be a so-called direct-write process, or may be a masked process. It should be noted that any "layer" referred to herein may comprise a substantially homogeneous material layer, or may comprise an inhomogeneous set of one or more material sub-layers. Spatially-selective material processing techniques may be implemented on a wafer scale for simultaneous fabrication/processing of multiple structures on a common substrate wafer.

The phrase "operationally acceptable" appears herein describing levels of various performance parameters of optical components and/or optical devices, such as optical power transfer efficiency (equivalently, optical coupling efficiency), optical loss, and modal dispersion. An operationally acceptable level may be determined by any relevant set or subset of applicable constraints or requirements arising from the performance, fabrication, device yield, assembly, testing, availability, cost, supply, demand, or other factors surrounding the manufacture, deployment, and/or use of a particular optical component or assembly. Such "operationally acceptable" levels of such parameters may therefor vary within a given class of devices depending on such constraints or requirements. For example, a lower optical coupling efficiency may be an acceptable trade-off for achieving lower modal dispersion in some instances, while higher optical coupling efficiency may be required in other instances in spite of higher modal dispersion. The "operationally acceptable" coupling efficiency and modal dispersion may therefore vary between instances. Many examples of such trade-offs may be imagined, with correspondingly differing definitions of "operationally acceptable". Optical components, planar waveguides, and fabrication or assembly methods therefor as disclosed herein, and equivalents thereof, may therefore be implemented within tolerances of varying precision depending on such "operationally acceptable" constraints and/or requirements. Terms such as "substantially" and so on, as used herein, shall be construed in light of this notion of "operationally acceptable" performance.

While particular examples have been disclosed herein employing specific materials and/or material combinations and having particular dimensions and configurations, it should be understood that many materials and/or material combinations may be employed in any of a variety of dimensions and/or configurations while remaining within the scope of inventive concepts disclosed and/or claimed herein. It should be pointed out that while wafer-scale processing sequences are set forth as examples, any or all of the processing sequences set forth herein, and/or equivalents thereof, may also be implemented for smaller sets of components, or for individual components, while remaining within the scope of the present disclosure and/or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: i) it is explicitly stated otherwise, e.g., by use of "either . . . or", "only one of . . . ", or similar language; or ii) two or more of the listed alternatives are mutually exclusive within the particular context, in which case "or" would encompass only those combinations involving non-mutually-exclusive alternatives. It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure or appended claims.

What is claimed is:

1. A method, comprising assembling an optical source and a multimode optical fiber so that an optical signal from the optical source is launched into the multimode optical fiber with a designed radial offset and a designed azimuthal angular offset relative to an optical propagation axis substantially defined by the multimode fiber, wherein the designed offsets are chosen so that the launched optical signal is preferentially coupled into optical modes of the multimode fiber exhibiting modal dispersion at or below an operationally acceptable value.

2. The method of claim 1, wherein the designed offsets are chosen so that the launched optical signal is preferentially coupled into optical modes of the multimode fiber resulting in a bandwidth-distance product for the multimode optical fiber at or above an operationally acceptable value.

3. The method of claim 1, further comprising:
    launching a test optical signal into the multimode optical fiber at a selected radial offset and at a selected azimuthal angular offset;
    monitoring the test optical signal after propagation along a length of the multimode optical fiber;
    characterizing a corresponding modal dispersion exhibited by the length of multimode optical fiber for the selected offsets;
    repeating the launching, monitoring, and characterizing steps for multiple selected radial offsets or for multiple selected azimuthal angular offsets; and
    choosing one of the selected radial offsets as the designed radial offset, and choosing one of the selected azimuthal angular offsets as the designed azimuthal angular offset.

4. The method of claim 1, further comprising:
    creating a mathematical model of an index profile for a multimode optical fiber;
    computationally simulating launch of a simulated test optical signal into the modeled multimode optical fiber at a selected radial offset and at a selected azimuthal angular offset;
    monitoring the simulated test optical signal after computationally simulated propagation along a length of the modeled multimode optical fiber;
    characterizing a corresponding computationally-simulated modal dispersion exhibited by the length of modeled multimode optical fiber for the selected offsets;
    repeating the simulated launch, monitoring, and characterizing steps for multiple selected radial offsets or for multiple azimuthal angular offsets; and choosing one of the selected radial offsets as the designed radial offset, and choosing one of the selected azimuthal angular offsets as the designed azimuthal angular offset.

5. The method of claim 1, wherein:
the optical source is adapted for delivering the optical signal in a designed optical beam; and
the designed optical beam is chosen so that the optical signal is preferentially coupled into optical modes of the multimode optical fiber exhibiting modal dispersion at or below an operationally acceptable value.

6. The method of claim 5, wherein the designed optical beam is chosen so that the optical signal is preferentially coupled into optical modes of the multimode optical fiber resulting in a bandwidth-distance product for the multimode optical fiber at or above an operationally acceptable value.

7. The method of claim 5, further comprising:
launching a test optical signal into the multimode optical fiber in a selected optical beam at a selected radial offset and at a selected azimuthal angular offset;
monitoring the test optical signal after propagation along a length of the multimode optical fiber;
characterizing a corresponding modal dispersion exhibited by the length of multimode optical fiber for the selected beam and offsets;
repeating the launching, monitoring, and characterizing steps for multiple selected beams, for multiple selected radial offsets, or for multiple selected azimuthal angular offsets; and
choosing one of the selected optical beams as the designed optical beam, choosing one of the selected radial offsets as the designed radial offset, and choosing one of the selected azimuthal angular offsets as the designed azimuthal angular offset.

8. The method of claim 5, further comprising:
creating a mathematical model of an index profile for a multimode optical fiber;
computationally simulating launch of a simulated test optical signal into the modeled multimode optical fiber in a selected optical beam at a selected radial offset and at a selected azimuthal angular offset;
monitoring the simulated test optical signal after computationally simulated propagation along a length of the modeled multimode optical fiber;
characterizing a corresponding computationally-simulated modal dispersion exhibited by the length of modeled multimode optical fiber for the selected beam and offsets;
repeating the simulated launch, monitoring, and characterizing steps for multiple selected optical beams, for multiple selected radial offsets, or for multiple azimuthal angular offsets; and
choosing one of the selected optical beams as the designed optical beam, choosing one of the selected radial offsets as the designed radial offset, and choosing one of the selected azimuthal angular offsets as the designed azimuthal angular offset.

9. The method of claim 1, wherein:
the optical source comprises a planar optical waveguide on a substrate;
the multimode optical fiber is mounted in a groove formed on the substrate at a first end of the planar optical waveguide; and
the groove is positioned and oriented relative to the end of the planar optical waveguide so as to yield the designed radial offset and the designed azimuthal angular offset.

10. The method of claim 9, wherein:
the planar optical waveguide is adapted at the first end thereof for delivering a designed optical beam;
the designed optical beam is chosen so that the optical signal is preferentially launched into optical modes of the multimode optical fiber exhibiting modal dispersion at or below an operationally acceptable value.

11. The method of claim 10, wherein the designed optical beam is chosen so that the optical signal is preferentially launched into optical modes of the multimode optical fiber resulting in a bandwidth-distance product for the multimode optical fiber at or above an operationally acceptable value.

12. The method of claim 10, wherein the designed optical beam has a designed beam size in at least one transverse dimension or a designed beam divergence in at least one transverse dimension.

13. The method of claim 10, wherein:
the planar optical waveguide comprises an optical waveguide splitter for delivering multiple optical beams to the multimode optical fiber at chosen positions and angles relative thereto; and
optical paths along branches of the planar optical waveguide from the optical waveguide splitter to the multimode optical fiber are chosen so that the multiple delivered optical beams form the designed optical beam.

14. The method of claim 10, wherein:
the planar optical waveguide comprises an optical waveguide interferometer; and
optical paths along branches of the optical waveguide interferometer are chosen so as to form the designed optical beam.

15. The method of claim 10, wherein the planar optical waveguide comprises a single-mode planar optical waveguide.

16. The method of claim 9, wherein:
the multimode optical fiber in the groove is substantially parallel to the substrate;
respective optical propagation axes of the planar optical waveguide and the multimode optical fiber are offset in a direction substantially perpendicular to the substrate, thereby determining at least in part the designed radial offset; and
respective optical propagation axes of the planar optical waveguide and the multimode optical fiber form an obtuse angle in a plane substantially parallel to the substrate, thereby determining at least in part the designed azimuthal offset.

17. The method of claim 9, wherein:
the multimode optical fiber in the groove forms an obtuse angle with the substrate;
respective optical propagation axes of the planar optical waveguide and the multimode optical fiber are offset in a direction substantially parallel to the substrate, thereby determining at least in part the designed radial offset; and
respective optical propagation axes of the planar optical waveguide and the multimode optical fiber form an obtuse angle in a plane substantially perpendicular to the substrate, thereby determining at least in part the designed azimuthal offset.

18. The method of claim 9, wherein an end face of the planar optical waveguide is oriented off-normal with respect to an optical propagation axis thereof, or an end face of the multimode optical fiber is oriented off-normal with respect to an optical propagation axis thereof, the off-normal orientation of the planar optical waveguide end face or the multimode optical fiber end face determining at least in part the designed azimuthal offset.

19. The method of claim 9, wherein:
the optical source further comprises a laser mounted on the substrate;
the optical signal is emitted by the laser, is received by the planar optical waveguide, propagates along the planar optical waveguide, emerges from the end of the planar optical waveguide, and is launched into the multimode optical fiber.

20. The method of claim 9, wherein:
the optical source further comprises a single mode optical fiber mounted in a second groove formed on the substrate at a second end of the planar optical waveguide;
the second groove is positioned and oriented relative to the second end of the planar optical waveguide so that an optical signal emerging from the single-mode optical fiber is received by the planar optical waveguide; and
the optical signal emerges from the single mode optical fiber, is received by the planar optical waveguide, propagates along the planar optical waveguide, emerges from the first end of the planar optical waveguide, and is launched into the multimode optical fiber.

21. The method of claim 1, wherein:
the multimode optical fiber is mounted in a first groove formed on a substrate;
the optical source comprises a single-mode optical fiber mounted in a second groove formed on the substrate; and
the second groove is positioned and oriented relative to the first groove so as to yield the designed radial offset and the designed azimuthal offset.

22. The method of claim 21, wherein:
the multimode optical fiber in the first groove is substantially parallel to the substrate;
the single-mode optical fiber in the second groove is substantially parallel to the substrate;
respective optical propagation axes of the multimode optical fiber and the single-mode optical fiber are offset in a direction substantially perpendicular to the substrate; and
respective optical propagation axes of the multimode optical fiber and the single-mode optical fiber form an obtuse angle in a plane substantially parallel to the substrate.

23. The method of claim 21, wherein:
the multimode optical fiber in the first groove or the single-mode optical fiber in the second groove forms an obtuse angle with the substrate;
respective optical propagation axes of the multimode optical fiber and the single-mode optical fiber are offset in a direction substantially parallel to the substrate; and
respective optical propagation axes of the multimode optical fiber and the single-mode optical fiber form an obtuse angle in a plane substantially perpendicular to the substrate.

24. The method of claim 21, wherein: wherein an end face of the multimode optical waveguide is oriented off-normal with respect to an optical propagation axis thereof, or an end face of the single-mode optical fiber is oriented off-normal with respect to an optical propagation axis thereof, the off-normal orientation of the multimode optical fiber end face or the single-mode optical fiber end face determining at least in part the designed azimuthal offset.

25. The method of claim 24, wherein:
respective optical propagation axes of the multimode optical fiber and the single-mode optical fiber are offset in a direction substantially perpendicular to the substrate; and
the off-normal fiber end face is tilted away from normal about an axis substantially perpendicular to the substrate.

26. The method of claims 24, wherein:
respective optical propagation axes of the multimode optical fiber and the single-mode optical fiber are offset in a direction substantially parallel to the substrate; and
the off-normal fiber end face is tilted away from normal about an axis substantially parallel to the substrate.

27. The method of claim 1, wherein a resulting bandwidth-distance product for the multimode fiber is greater than about 500 MHz-km.

28. The method of claim 27, wherein the resulting bandwidth-distance product for the multimode fiber is greater than about 700 MHz-km.

29. The method of claim 27, wherein the resulting bandwidth-distance product for the multimode fiber is greater than about 1 GHz-km.

30. The method of claim 27, wherein the resulting bandwidth-distance product for the multimode fiber is greater than about 2 GHz-km.

31. The method of claim 1, wherein the multimode optical fiber comprises legacy multimode optical fiber.

32. The method of claim 31, wherein the multimode optical fiber comprises previously deployed legacy multimode optical fiber.

33. A method, comprising launching an optical signal from an optical source into a multimode optical fiber with a designed radial offset and a designed azimuthal angular offset relative to an optical propagation axis substantially defined by the multimode fiber, wherein the designed offsets are chosen so that the launched optical signal is preferentially coupled into optical modes of the multimode fiber resulting in a bandwidth-distance product for the multimode optical fiber at or above an operationally acceptable value.

34. The method of claim 33, wherein:
the optical source is adapted for delivering the optical signal in a designed optical beam; and
the designed optical beam is chosen so that the optical signal is preferentially coupled into optical modes of the multimode optical fiber resulting in a bandwidth-distance product for the multimode optical fiber at or above an operationally acceptable value.

35. The method of claim 33, wherein:
the optical source comprises a planar optical waveguide on a substrate;
the launching means comprises a groove formed on the substrate at a first end of the planar optical waveguide;
the multimode optical fiber is mounted on the substrate in the groove; and
the groove is positioned and oriented relative to the end of the planar optical waveguide so as to yield the designed radial offset and the designed azimuthal angular offset.

36. The method of claim 33, wherein:
the multimode optical fiber is mounted in a first groove formed on a substrate;
the optical source comprises a single-mode optical fiber mounted in a second groove formed on the substrate; and
the second groove is positioned and oriented relative to the first groove so as to yield the designed radial offset and the designed azimuthal offset.

37. The method of claim 33, wherein the resulting bandwidth-distance product for the multimode fiber is greater than about 500 MHz-km.

38. The method of claim 33, wherein the multimode optical fiber comprises legacy multimode optical fiber.

39. An apparatus, comprising:
an optical source;
a multimode optical fiber; and
means for launching an optical signal from the optical source into the multimode optical fiber with a designed radial offset and a designed azimuthal angular offset relative to an optical propagation axis substantially defined by the multimode optical fiber,
wherein the designed offsets are chosen so that the optical signal is preferentially launched into optical modes of the multimode optical fiber resulting in a bandwidth-distance product for the multimode optical fiber at or above an operationally acceptable value.

40. The apparatus of claim 39, wherein:
the optical source is adapted for delivering the optical signal in a designed optical beam; and
the designed optical beam is chosen so that the optical signal is preferentially launched into optical modes of the multimode optical fiber resulting in a bandwidth-distance product for the multimode optical fiber at or above an operationally acceptable value.

41. The apparatus of claim 39, wherein:
the optical source comprises a planar optical waveguide on a substrate;
the launching means comprises a groove formed on the substrate at a first end of the planar optical waveguide;
the multimode optical fiber is mounted on the substrate in the groove; and
the groove is positioned and oriented relative to the end of the planar optical waveguide so as to yield the designed radial offset and the designed azimuthal angular offset.

42. The apparatus of claim 39, wherein:
the launching means comprises a substrate having a first groove and a second groove formed thereon;
the multimode optical fiber is mounted on the substrate in the first groove;
the optical source comprises a single-mode optical fiber mounted on the substrate in the second groove;
the second groove is positioned and oriented relative to the first groove so as to yield the designed radial offset and the designed azimuthal offset.

43. The apparatus of claim 39, wherein the resulting bandwidth-distance product for the multimode fiber is greater than about 500 MHz-km.

44. The apparatus of claim 39, wherein the multimode optical fiber comprises legacy multimode optical fiber.

45. The apparatus of claim 39, wherein the multimode optical fiber comprises previously deployed legacy multimode optical fiber.

46. An apparatus, comprising:
an optical source;
a multimode optical fiber; and
means for launching an optical signal from the optical source into the multimode optical fiber with a designed radial offset and a designed azimuthal angular offset relative to an optical propagation axis substantially defined by the multimode optical fiber,
wherein the designed offsets are chosen so that the optical signal is preferentially launched into optical modes of the multimode optical fiber exhibiting modal dispersion at or below an operationally acceptable value.

47. The apparatus of claim 46, wherein:
the optical source is adapted for delivering the optical signal in a designed optical beam; and
the designed optical beam is chosen so that the optical signal is preferentially coupled into optical modes of the multimode optical fiber exhibiting modal dispersion at or below the predetermined operationally acceptable value.

48. The apparatus of claim 46, wherein:
the optical source comprises a planar optical waveguide on a substrate;
the launching means comprises a groove formed on the substrate at a first end of the planar optical waveguide;
the multimode optical fiber is mounted on the substrate in the groove; and
the groove is positioned and oriented relative to the end of the planar optical waveguide so as to yield the designed radial offset and the designed azimuthal angular offset.

49. The apparatus of claim 46, wherein:
the launching means comprises a substrate having a first groove and a second groove formed thereon;
the multimode optical fiber is mounted on the substrate in the first groove;
the optical source comprises a single-mode optical fiber mounted on the substrate in the second groove;
the second groove is positioned and oriented relative to the first groove so as to yield the designed radial offset and the designed azimuthal offset.

50. The apparatus of claim 46, wherein the multimode optical fiber comprises legacy multimode optical fiber.

51. The apparatus of claim 46, wherein the multimode optical fiber comprises previously deployed legacy multimode optical fiber.

* * * * *